US008698911B2

(12) United States Patent
Okazaki

(10) Patent No.: US 8,698,911 B2
(45) Date of Patent: Apr. 15, 2014

(54) SOUND RECORDING DEVICE, IMAGING DEVICE, PHOTOGRAPHING DEVICE, OPTICAL DEVICE, AND PROGRAM

(75) Inventor: Mitsuhiro Okazaki, Saitama (JP)

(73) Assignee: Nikon Corporation, Tokyo (JP)

( * ) Notice: Subject to any disclaimer, the term of this patent is extended or adjusted under 35 U.S.C. 154(b) by 416 days.

(21) Appl. No.: 12/913,907

(22) Filed: Oct. 28, 2010

(65) Prior Publication Data
US 2011/0234848 A1 Sep. 29, 2011

(30) Foreign Application Priority Data

Oct. 28, 2009 (JP) ................................. 2009-247587
Oct. 30, 2009 (JP) ................................. 2009-250337

(51) Int. Cl.
*H04N 5/228* (2006.01)
*H04N 5/217* (2011.01)

(52) U.S. Cl.
USPC ..................... 348/222.1; 348/241; 348/231.4; 348/281; 381/71.7

(58) Field of Classification Search
USPC ........... 348/222.1, 241, 231.4; 381/71.7, 71.1
See application file for complete search history.

(56) References Cited

U.S. PATENT DOCUMENTS

| 8,311,236 B2 * | 11/2012 | Kanamori ........................ 381/92 |
| 8,379,110 B2 * | 2/2013 | Masuda ...................... 348/231.4 |
| 2003/0161484 A1 * | 8/2003 | Kanamori et al. ............ 381/71.7 |
| 2004/0032509 A1 * | 2/2004 | Owens et al. ............... 348/222.1 |
| 2010/0118201 A1 * | 5/2010 | Jeong et al. .................... 348/581 |

FOREIGN PATENT DOCUMENTS

| JP | A-02-001661 | 1/1990 |
| JP | A-09-274772 | 10/1997 |
| JP | A-2001-176215 | 6/2001 |
| JP | A 2001-267974 | 9/2001 |
| JP | A-2001-332017 | 11/2001 |
| JP | A-2002-041088 | 2/2002 |
| JP | A-2004-023191 | 1/2004 |
| JP | A-2005-077889 | 3/2005 |
| JP | A-2005-107283 | 4/2005 |
| JP | A-2005-228400 | 8/2005 |
| JP | A-2006-179996 | 7/2006 |

(Continued)

OTHER PUBLICATIONS

Oct. 16, 2012 Office Action issued in Japanese Patent Application No. 2009-250337 (with translation).

(Continued)

*Primary Examiner* — Hung Lam
(74) *Attorney, Agent, or Firm* — Oliff PLC

(57) ABSTRACT

A sound recording device includes an input unit, a timing detection unit, a section setting unit that sets a first section including a section in which an operation unit operates in a sound signal, a reference signal determination unit that determines, as a first reference signal, the sound signal corresponding to a second section following the first section, a signal detection unit that detects, as a second reference signal, a sound signal with the highest correlation with the first reference signal, an interpolation signal detection unit that detects, as an interpolation signal, a sound signal that follows the second reference signal detected by the signal detection unit in the sound signal and has the same time length as the first section, a signal replacement unit that replaces the sound signal in the first section with the interpolation signal, and a recording unit that records the sound signal replaced by the signal replacement unit.

13 Claims, 19 Drawing Sheets

(56) References Cited

FOREIGN PATENT DOCUMENTS

| | | |
|---|---|---|
| JP | A-2006-203376 | 8/2006 |
| JP | A 2006-243644 | 9/2006 |
| JP | A-2006-270591 | 10/2006 |
| JP | A-2006-279185 | 10/2006 |
| JP | A-2006-287387 | 10/2006 |
| JP | A-2008-053802 | 3/2008 |
| JP | A-2008-058343 | 3/2008 |
| JP | A-2008-071374 | 3/2008 |
| JP | A 2008-197209 | 8/2008 |

OTHER PUBLICATIONS

Office Action issued in Japanese Application No. 2009-247587 dated Nov. 22, 2011 (with translation).

Office Action issued in Japanese Application No. 2009-250337 dated Dec. 6, 2011 (with translation).

Feb. 14, 2012 Office Action issued in Japanese Application No. 2009-247587 (with translation).

Aug. 27, 2013 Notice of Reasons for Rejection issued in Japanese Patent Application No. 2009-250337 (with translation).

* cited by examiner

SOUND RECORDING DEVICE, IMAGING DEVICE, PHOTOGRAPHING DEVICE, OPTICAL DEVICE, AND PROGRAM

CROSS-REFERENCE TO RELATED APPLICATION

Priority is claimed on Japanese Patent Application No. 2009-247587, filed Oct. 28, 2009 and Japanese Patent Application No. 2009-250337, filed Oct. 30, 2009, the disclosures of which are hereby incorporated herein by references in their entireties.

BACKGROUND

1. Technical Field

The present invention relates to a sound recording device, an imaging device including the sound recording device, a photographing device, an optical device, and a program.

2. Background Art

A conventional method of replacing a loss section of a sound signal in which noise or discontinuity is generated in a sound signal before and after the loss section is disclosed (see Japanese Patent Application Publication No. H09-274772A)

Further, a photographing device for subtracting noise resulting from motor driving from a sound signal in a frequency domain to reduce the noise generated in the sound signal is disclosed in Japanese Patent Application Publication No. 2006-203376A.

SUMMARY

In the method disclosed in Japanese Patent Application Publication No. H09-274772A, since a loss section of a sound signal is simply replaced with a sound signal before and after the loss section, a large discontinuity portion may be generated in the sound signal before and after the loss section and auditory disharmony may be generated.

Further, noises include a noise having a large amplitude instantaneously generated, for example, in motor driving initiation and a noise that is normally generated in a period in which a motor is driven, following the noise. In Japanese Patent Application Publication No. 2006-203376A, the photographing device performs a noise reduction process without discrimination of the noise having a large amplitude instantaneously generated or noise normally generated in the period in which the motor is driven. Accordingly, noise having a large amplitude instantaneously generated cannot be reduced.

An object of the present invention is to provide a sound recording device, an imaging device, and a program capable of suppressing auditory disharmony when reducing noises included in a sound signal.

Another object is to provide a photographing device, an optical device, and a program capable of reducing noise in a sound signal.

According to one aspect of the present invention, a sound recording device is provided including: an input unit to which a sound signal is input; a timing detection unit that detects a timing when an operation unit operates; a section setting unit that sets a first section including a section in which the operation unit operates in the sound signal, based on the timing detected by the timing detection unit; a reference signal determination unit that determines, as a first reference signal, the sound signal corresponding to a second section following the first section in the sound signal; a signal detection unit that detects, as a second reference signal, a sound signal with the highest correlation with the first reference signal in the sound signal; an interpolation signal detection unit that detects, as an interpolation signal, a sound signal that follows the second reference signal detected by the signal detection unit in the sound signal and has the same time length as the first section; a signal replacement unit that replaces the sound signal in the first section with the interpolation signal; and a recording unit that records the sound signal replaced by the signal replacement unit.

According to another aspect of the present invention, an imaging device is provided including: the sound recording device described above; and an imaging unit for imaging an image from an optical system.

According to yet another aspect of the present invention, a program is provided for causing a computer to execute: an input step of inputting a sound signal and a timing indicating that an operation unit included in a device having recorded the sound signal operates; a section setting step of setting a first section including a section in which the operation unit operates in the sound signal based on the input timing; a reference signal determining step of determining, as a first reference signal, the sound signal corresponding to a second section following the first section in the sound signal; a signal detecting step of detecting, as a second reference signal, a sound signal with the highest correlation with the first reference signal in the sound signal; an interpolation signal detecting step of detecting, as an interpolation signal, a sound signal that follows the second reference signal detected in the signal detecting step in the sound signal and has the same time length as the first section; and a signal replacing step of replacing the sound signal in the first section with the interpolation signal.

According to yet another aspect of the present invention, a photographing device is provided including: a photographing unit that photographs an image by an optical system; a microphone that converts a sound wave into an electrical signal; a signal detection unit that detects at least one of a sensor signal detected by a sensor for detecting a photographing state and a control signal for controlling photographing; a determining unit that determines whether there is a change in a photographing operation using at least one of the sensor signal and the control signal; and a noise processing unit that makes a process of reducing noise in the electrical signal different when the determining unit determines that there is a change in a photographing operation and when the determining unit does not determine that there is a change in a photographing operation.

According to yet another aspect of the present invention, an optical device is provided including: an optical system that forms an image by the optical system; a microphone that converts a sound wave into an electrical signal; a signal detection unit that detects at least one of a sensor signal detected by a sensor for detecting a photographing state, and a control signal for controlling photographing; a determining unit that determines whether there is a change in a photographing operation using at least one of the sensor signal and the control signal; and a noise processing unit that makes a process of reducing noise in the electrical signal different when the determining unit determines that there is a change in the photographing operation and when the determining unit does not determine that there is a change in the photographing operation.

According to yet another aspect of the present invention, a program is provided for causing a computer to execute: an input step of receiving at least one of a sound signal acquired upon photographing, a sensor signal detected by a sensor for detecting a photographing state, and a control signal for controlling photographing; a determining step of determining whether there is a change in a photographing operation using at least one of the sensor signal and the control signal; and a noise processing step of making a process of reducing noise in the sound signal different when it is determined that there is a change in the photographing operation and when it is not determined that there is a change in the photographing operation.

According to an aspect of the present invention, it is possible to reduce noise in a sound signal while suppressing auditory disharmony.

Further, according to an aspect of the present invention, it is also possible to provide a photographing device, an optical device, and a program capable of preferably reducing noise in a sound signal.

DESCRIPTION OF EMBODIMENTS

<First Embodiment>

Figure 1:
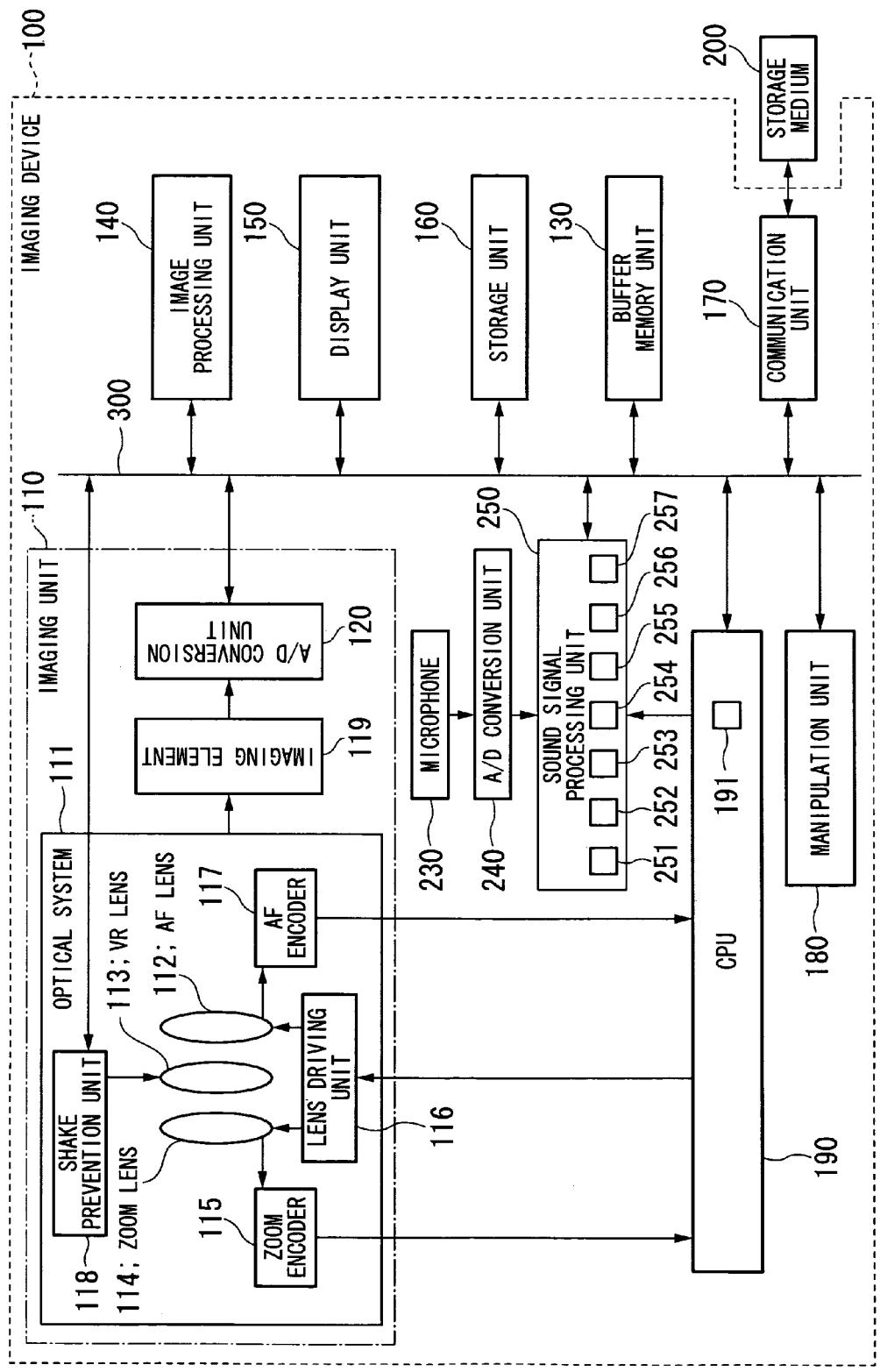
FIG. 1 is a block diagram showing an example of a configuration of an imaging device including a sound recording device according to one embodiment (a first embodiment) of the invention.

Hereinafter, an embodiment of the present invention will be described with reference to the accompanying drawings. FIG. 1 is a schematic block diagram showing a configuration of an imaging device (photographing device) including a sound recording device according to one embodiment of the invention.

As shown in FIG. 1, an imaging device (photographing device) 100 according to the present embodiment includes an imaging unit 110, a central processing unit (CPU) 110, a manipulation unit 180, an image processing unit 140, a display unit 150, a storage unit 160, a buffer memory unit 130, a communication unit 170, a microphone 230, an analog/digital (A/D) conversion unit 240, a sound signal processing unit 250, and a bus 300. Among the components included in the imaging device 100, for example, the microphone 230, the A/D conversion unit 240, and the sound signal processing unit 250 correspond to a sound recording device.

The imaging unit 110 includes an optical system 111, an imaging element 119, and an analog/digital (A/D) conversion unit 120, and is controlled by the CPU 190 according to a set imaging condition (e.g. an aperture value or an exposure value). Further, the imaging unit 110 generates image data based on an optical image obtained by forming an optical image by the optical system 111 using the imaging element 119 and converting the optical image into a digital signal using the A/D conversion unit 120.

The optical system 111 includes a zoom lens 114, a shake prevention lens (hereinafter, referred to as a vibration reduction (VR) lens) 113 (shake correction lens 113), a focus adjustment lens (hereinafter, referred to as an auto focus (AF) lens) 112, a zoom encoder 115, a lens driving unit 116, an AF encoder 117, and a shake prevention unit 118 (image blur correction unit 118).

The optical system 111 guides an optical image passing through the zoom lens 114, the VR lens 113, and the AF lens 112 to a light receiving surface of the imaging element 119. In other words, the optical system 111 guides incident light passing through the zoom lens 114, the AF lens 112, and the VR lens 113 to the light receiving surface of the imaging element 119 and forms an optical image.

The lens driving unit 116 controls a position of the zoom lens 114 or the AF encoder 117 based on a drive control signal (control signal) input from the CPU 190, which will be described below. Alternatively, the lens driving unit 116 controls positions of the AF lens 112 and the zoom lens 114 based on a control signal input from the CPU 190, which will be described below. The lens driving unit 116 includes an actuator driven in photographing. Here, the actuator driven in photographing may be, for example, a motor for driving the AF lens 112, the zoom lens 114 or the like. The actuator may be included either in the imaging device 100 or in the optical system (lens barrel) detachably provided in the imaging device 100.

The shake prevention unit 118 (image blur correction unit 118) detects image blur caused by the optical system 111 in a photographing state, and outputs it as a sensor signal to the CPU 190. The shake prevention unit 118 (image blur correction unit 118) controls a position of the VR lens 113 based on a drive control signal (control signal) input from the CPU 190, which will be described below. For example, the shake prevention unit 118 (image blur correction unit 118) drives the VR lens 113 in a direction for canceling the shake. The shake prevention unit 118 may detect the position of the VR lens 113 and output it as a sensor signal to the CPU 190.

The zoom encoder 115 detects a drive direction of the zoom lens 114 in the photographing state and outputs a signal according to the drive direction of the zoom lens 114 as a sensor signal to the CPU 190. Here, the signal according to the drive direction of the zoom lens 114 may be a signal indicating that the zoom lens 114 is in any one of a state in which the zoom lens 114 stops in the optical system 111, a state in which the zoom lens 114 is driven in an infinite-end direction (a motor, a cam or the like for driving the zoom lens 114 are rotated, for example, in clockwise (CW)), and a state in which the zoom lens 114 is driven in a near-end direction (the motor, the cam or the like for driving the zoom lens 114 are rotated, for example, in counter clockwise (CCW)). That is, the detection of the drive direction of the zoom lens 114 may be a detection of the rotation direction of the motor, the cam or the like for driving the zoom lens 114. The motor, the cam or the like for driving the zoom lens 114 may be included in the lens driving unit 116. Further, the zoom encoder 115 detects a zoom position indicating the position of the zoom lens 114 based on the detected drive direction and drive amount of the zoom lens 114, and outputs the detected zoom position to the CPU 190.

The AF encoder 117 detects the drive direction of the AF lens 112 in the photographing state, and outputs a signal according to the drive direction of the AF lens 112 as a sensor signal to the CPU 190. Here, the signal according to the drive direction of the AF lens 112 may be a signal indicating that the AF lens 112 is in any one of a state in which the AF lens 112 stops in the optical system 111, a state in which the AF lens 112 is driven in an infinite-end direction (the motor, the cam or the like for driving the AF lens 112 are rotated, for example, in CW), and a state in which the AF lens 112 is driven in a near-end direction (the motor, the cam or the like for driving the AF lens 112 are rotated, for example, in CCW). That is, the detection of the drive direction of the AF lens 112 may be a detection of the rotation direction of the motor, the cam or the like for driving the AF lens 112. The motor, the cam or the like for driving the AF lens 112 may be included in the lens driving unit 116. Further, the AF encoder 117 detects a focus position indicating the position of the AF lens 112 based on the detected drive direction and drive amount of the AF lens 112, and outputs it as a sensor signal to the CPU 109 or outputs the detected zoom position and the detected focus position to the CPU 190.

The above-described optical system 111 may be integrally attached to the imaging device 100 or may be detachably attached to the imaging device 100.

The imaging element 119 includes, for example, a photoelectric conversion surface, and converts an optical image formed on the light receiving surface into an electrical signal, and outputs the electrical signal to the A/D conversion unit 120.

Further, the imaging element 119 stores image data obtained when a photographing instruction is received via the manipulation unit 180 as image data of a still image or a moving image, in a storage medium 200 via the A/D conversion unit 120.

Meanwhile, the imaging element 119 outputs, for example, image data continuously obtained in a state in which the imaging instruction is not received via the manipulation unit 180 as through-the-lens image data to the CPU 190 and the display unit 150 via the A/D conversion unit 120.

The A/D conversion unit 120 converts the electronic signal from the imaging element 119 into a digital signal, and outputs image data as the digital signal (to the buffer memory unit 130).

The manipulation unit 180 includes, for example, a power switch, a shutter button, a multi-selector (a cross key), and/or other manipulation keys, and receives a user manipulation input when the manipulation unit 180 is manipulated by a user, and outputs a signal according to the manipulation input to the CPU 190.

The image processing unit 140 performs image processing on the image data temporarily stored in the buffer memory unit 130 by referencing an image processing condition stored in the storage unit 160. The image-processed image data is stored in the storage medium 200 via the communication unit 170. The image processing unit 140 may also perform image processing on the image data stored in the storage medium 200.

The display unit 150 is, for example, a liquid crystal display, and displays the image data obtained by the imaging unit 110, a manipulation screen or the like.

The storage unit 160 stores a determining condition referenced when a scene determining is made by the CPU 190, an imaging condition corresponding to each scene determined by the scene determining, and so on.

The microphone 230 receives sound, converts a sound wave of sound into an electrical signal (analog signal), and outputs the electrical signal. That is, the microphone 230 outputs the sound signal according to the received sound (hereinafter, referred to as "microphone output signal") to the buffer memory unit 130 via the sound signal processing unit 240.

The A/D conversion unit 240 converts the analog sound signal input from the microphone 230, into a digital sound signal through analog-digital conversion.

The sound signal processing unit 250 executes, for example, sound signal processing, such as noise reduction, for the sound signal converted into the digital signal by the A/D conversion unit 240, and stores the sound-signal-processed sound signal in the storage medium 200. The sound signal processing unit 250 will be described in detail below.

When the sound signal sound-signal-processed by the sound signal processing unit 250 is stored in the storage medium 200, the sound signal is stored to be associated, in terms of time, with the image data acquired by the imaging element 119, or may be stored as a moving image including the sound signal.

The buffer memory unit 130 temporarily stores the image data acquired by the imaging unit 110. Further, the buffer memory unit 130 temporarily stores the sound signal according to the sound received by the microphone 230.

The communication unit 170 is connected to the detachable storage medium 200, such as a card memory, and writes, reads, or deletes information to or from the storage medium 200.

The storage medium 200 is a storage unit detachably connected to the imaging device 100, and for example, stores the image data which is generated (photographed) by the imaging unit 110 and the sound signal sound-signal-processed by the sound signal processing unit 250.

The CPU 190 controls the entire imaging device. For example, the CPU 190 generates the drive control signal to control the positions of the zoom encoder 115 and the AF encoder 117 based on a zoom position that is input from the zoom encoder 115, a focus position that is input from the AF encoder 117, and a manipulation input that is input from the manipulation unit 180. The CPU 190 controls the positions of the zoom encoder 115 and the AF encoder 117 via the lens driving unit 116 based on the drive control signal.

Further, the CPU 190 includes a timing detection unit 191. The timing detection unit 191 detects timing when an operation unit included in the imaging device 100 operates.

For example, the operation unit noted herein is of the zoom lens 114, the VR lens 113, the AF lens 112, or the manipulation unit 180 described above, and is a component from which sound is generated (can be generated) when the component operates or is operated among the components included in the imaging device 100.

Further, the operation unit is a component from which sound generated when the component operates or is operated is received (or can be received) by the microphone 230 among the components included in the imaging device 100.

The timing detection unit 191 may detect timing when the operation unit operates based on a control signal to operate the operation unit. The control signal is a control signal to cause the driving unit operating the operation unit to operate the operation unit, or a control signal to drive the driving unit.

For example, the timing detection unit 191 may detect the timing when the operation unit operates based on the drive control signal that is input to the lens driving unit 116 or the shake prevention unit 118 in order to drive the zoom lens 114, the VR lens 113, or the AF lens 112, or based on the drive control signal generated by the CPU 190.

When the CPU 190 generates the drive control signal, the timing detection unit 191 may also detect timing when the operation unit operates, based on a process or a command executed inside the CPU 190.

Alternatively, the timing detection unit 191 may detect the timing when the operation unit operates, based on a signal indicating that the zoom lens 114 or the AF lens 112 is driven, which is input from the manipulation unit 180.

Alternatively, the timing detection unit 191 may detect the timing when the operation unit operates based on a signal indicating that the operation unit is operated.

For example, the timing detection unit 191 may detect the timing when the operation unit operates by detecting that the zoom lens 114 or the AF lens 112 is driven based on the output of the zoom encoder 115 or the AF encoder 117.

Alternatively, the timing detection unit 191 may detect the timing when the operation unit operates, by detecting that the VR lens 113 is driven based on the output from the shake prevention unit 118.

Alternatively, the timing detection unit 191 may detect the timing when the operation unit operates, by detecting that the manipulation unit 180 is manipulated based on the input from the manipulation unit 180.

The timing detection unit 191 detects when the operation unit included in the imaging device 100 operates, and outputs a signal indicating the detected timing to the sound signal processing unit 250 (see a signal A of FIG. 2, which will be described below).

The bus 300 is connected to the imaging unit 110, the CPU 190, the manipulation unit 180, the image processing unit 140, the display unit 150, the storage unit 160, the buffer memory unit 130, and the communication unit 170, and transfers, for example, data output from each unit.

<Detailed Configuration of Sound Signal Processing Unit 250>

Next, the sound signal processing unit 250 will be described in detail. The sound signal processing unit 250 includes a section setting unit 251, a reference signal determination unit 252, a signal detection unit 253, an interpolation signal detection unit 254, a signal replacement unit 255, a recording unit 256, and a signal processing unit 257.

Here, the respective components will be described with reference to a waveform of the sound signal input from the A/D conversion unit 240 shown in FIG. 1 (see a signal O of FIG. 2), control signals (see signals A, B, C, D, and E of FIG. 2), which will be described below, and a first reference signal shown in FIG. 3, which will be described below. In FIGS. 2 and 3, the horizontal axis is a time axis and the vertical axis indicates, for example, a voltage of each signal.

Figure 2:
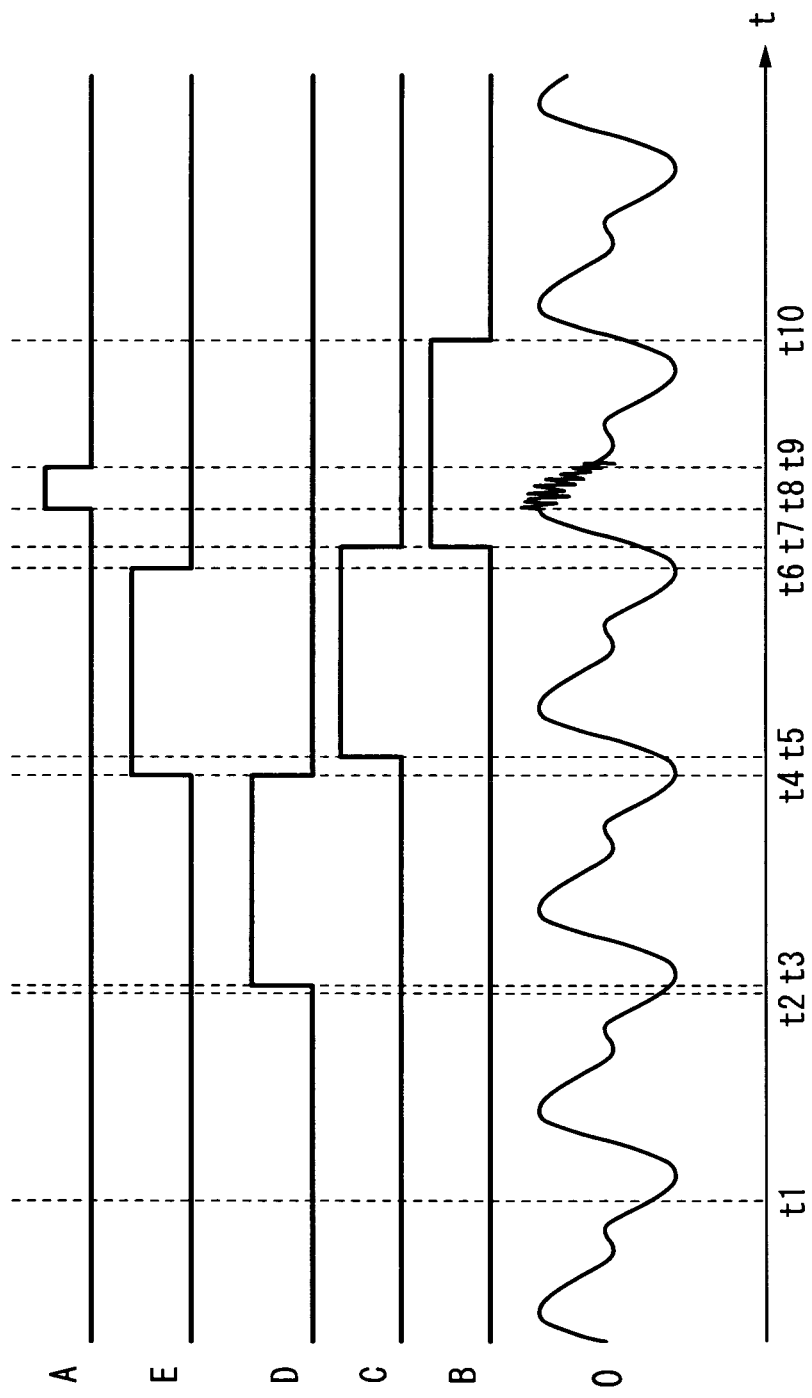
FIG. 2 is a waveform diagram showing a waveform of a sound signal, as one example, and a method of generating an interpolation signal in the case of the sound signal.
Figure 3:
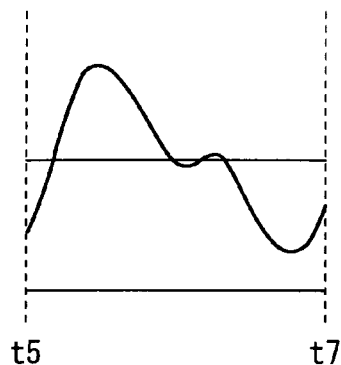
FIG. 3 is a waveform diagram showing a first reference signal as one example in FIG. 2.

As shown in the signal O of FIG. 2, for example, in the case of a sound signal received through sound or in the case of sound, there are many relatively repeated signals as shown in FIG. 2 within a short period of time in the order of tens of milliseconds. Accordingly, a sound signal in a section in which noise overlaps may be replaced with a sound signal in another section, as described below.

In FIG. 2, a signal A becomes high corresponding to the timing detected by the timing detection unit 191. The signal A is, for example, a signal input from the timing detection unit 191 to the sound signal processing unit 250, and is a signal indicating a section in which the operation unit operates.

In FIG. 2, the signal A becomes high in a section from a time t8 to a time t9. For example, in the section from the time t8 to the time t9, noise caused by operation of the operation unit overlaps the signal O (is generated) or is highly likely to overlap the signal O.

In FIG. 2, the signal A is, for example, a signal output from the timing detection unit 191 to the section setting unit 251 of the sound signal processing unit 250, and is a signal indicating a section in which the driving unit is driven.

A signal B is, for example, a signal output from the section setting unit 251 of the sound signal processing unit 250 to the reference signal determination unit 252 of the sound signal processing unit 250, and is a signal indicating a first section including the section in which the operation unit operates, as described below, in the sound signal (signal O).

A signal C is, for example, a signal output from the reference signal determination unit 252 of the sound signal processing unit 250 to the signal detection unit 253 of the sound signal processing unit 250, and is a signal indicating a second section following the first section, as described below, in the sound signal (signal O), i.e., a section indicating a first reference signal.

A signal D is, for example, output from the signal detection unit 253 of the sound signal processing unit 250 to the interpolation signal detection unit 254 of the sound signal processing unit 250 and indicates a section of the sound signal with the highest correlation with the first reference signal, as described below, in the sound signal (signal O), i.e., a section of a second reference signal.

A signal E is, for example, a signal output from the interpolation signal detection unit 254 of the sound signal processing unit 250 to the signal replacement unit 255 of the sound signal processing unit 250, and is a signal indicating a section of an interpolation signal, as described below, in the sound signal (signal O).

Referring back to FIG. 1, each component included in the sound signal processing unit 250 will be described.

The section setting unit 251 sets a first section including the section in which the operation unit operates, in the sound signal input from the A/D conversion unit 240 based on the timing detected by the timing detection unit 191.

For example, the section setting unit 251 sets a section from a time t7 to a time t10 as the first section, (see a section in which the signal B of FIG. 2 is high) corresponding to the timing detected by the timing detection unit 191 (see a section from the time t8 to the time t9 that is the section in which the signal A becomes high).

The reference signal determination unit 252 determines a sound signal corresponding to the second section following the first section in the sound signal input from the A/D conversion unit 240 as the first reference signal. For example, the reference signal determination unit 252 determines the first reference signal by defining a section following the first section before the first section in the sound signal as the second section.

In FIG. 2, the reference signal determination unit 252 defines a section following the first section before the first section in the sound signal, i.e., before the time t7, such as a section from a time t5 to the time t7, as the second section (see a section in which the signal C of FIG. 2 is high), and determines the sound signal corresponding to the second section as the first reference signal.

In FIG. 3, one example of the first reference signal is illustrated. Here, a waveform of substantially one period of the sound signal is illustrated as the first reference signal, but the period used as the first reference signal is arbitrary. For example, a sound signal with a plurality of periods may be included or the first reference signal may be a portion of a sound signal with one period.

A sound signal with the highest correlation with the first reference signal is detected in the sound signal, as described below. Accordingly, a time length of the section of the first reference signal is, preferably, great so that the sound signal with a high correlation with the first reference signal can be detected. When a sound signal such as a human voice is previously determined as a noise reduction target, the time length of the section of the first reference signal may be set in advance according to the sound signal as a target.

Returning to the description of each component included in the sound signal processing unit 250 of FIG. 1, the signal detection unit 253 detects, as the second reference signal, a sound signal with the highest correlation with the first reference signal in the sound signal excluding a sound signal corresponding to the second section. For example, the signal detection unit 253 detects, as the second reference signal, a sound signal with the highest correlation with the first reference signal in the section before the second section in the sound signal.

For example, the signal detection unit 253 detects, as the second reference signal, a sound signal with the highest correlation with the first reference signal in the section before the second section in the sound signal, i.e., a section before the time t5, such as a sound signal from a time t3 to a time t4 in this case (see a section in which the signal D is high).

Here, a section from which the second reference signal is retrieved may be a section before the time t5, and may have a time length which includes all sound signals before the time t5, but since a sound signal with a high correlation with the first reference signal is highly likely to be in the vicinity of the first reference signal, several to tens of times the time length of the second section is preferable.

The interpolation signal detection unit 254 detects, as an interpolation signal, a sound signal that follows the second reference signal detected by the signal detection unit 253 and has the same time length as the first section, in the sound signal input from the A/D conversion unit 240. For example, the interpolation signal detection unit 254 detects, as the interpolation signal, a sound signal that is consecutive after the second reference signal and has the same time length as the first section.

In FIG. 2, the interpolation signal detection unit 254 detects, as the interpolation signal, a sound signal from the time t4 to a time t6, which is a sound signal that is consecutive after the second reference signal and has the same time length as the first section (see a section in which the signal E is high).

The signal replacement unit 255 replaces the sound signal in the first section with the interpolation signal. In this case, the signal replacement unit 255 replaces the sound signal in the first section corresponding to the time t7 to the time t10 with the interpolation signal, which is a sound signal from the time t4 to the time t6.

When the signal replacement unit 255 replaces the sound signal in the first section with the interpolation signal, the signal replacement unit 255 may perform, for example, cross-fading so that connection portions of the sound signal are connected.

The signal processing unit 257 performs a spectral subtraction (SS) process or a spectral noise gating (SNG) process on the sound signal replaced by the signal replacement unit 255.

A time length of the first section set by the above-described section setting unit 251 may be integral multiple of a section that corresponds to a processing unit of the SS process or the SNG process executed by the signal processing unit 257.

Thus, infection on the SS process or SNG process of the replaced boundary portion can be reduced when the SS process or SNG process is performed on the replaced sound signal, thus reducing auditory disharmony.

The recording unit 256 records the sound signal replaced by the signal replacement unit 255 or the sound signal processed by the signal processing unit 257 in the storage medium 200 via the communication unit 170. When the recording unit 256 records the sound signal in the storage medium 200, the recording unit 256 may store the sound signal to be related, in terms of time, to the image data acquired by the imaging element 119.

Figure 4:
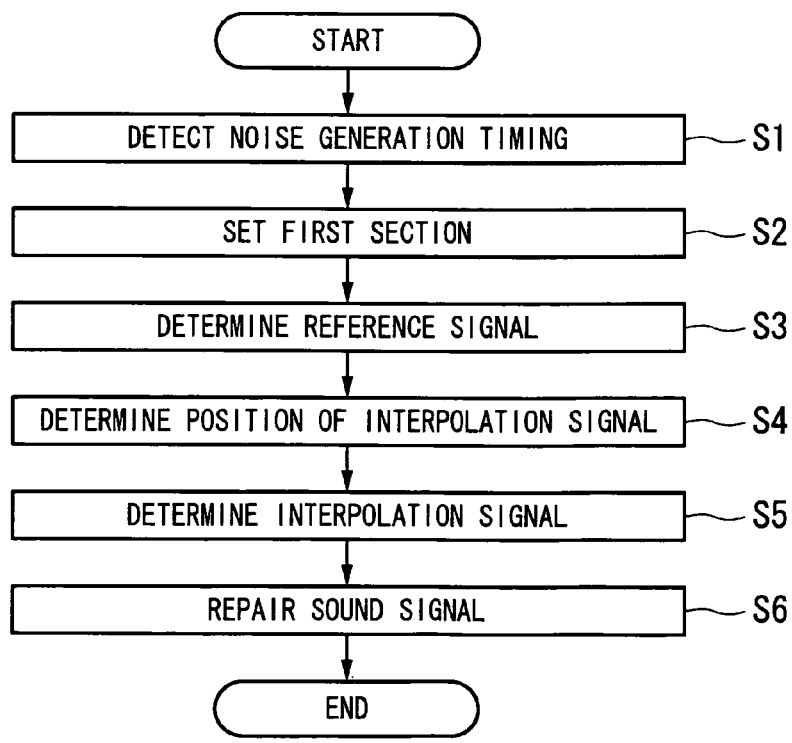
FIG. 4 is a flowchart showing an operation, as one example, of an imaging device including a sound recording device shown in FIG. 1.

Next, an operation when the recording device of the imaging device according to the first embodiment performs signal processing on the sound signal will be described using a flowchart of FIG. 4.

First, the timing detection unit 191 detects when an operation unit included in the imaging device 100 operates (step S1).

Next, the section setting unit 251 sets a first section including the section in which the operation unit operates, in the sound signal input from the A/D conversion unit 240, based on the timing detected by the timing detection unit 191 (step S2).

The reference signal determination unit 252 then determines, as the first reference signal, a sound signal corresponding to a second section following the first section in the sound signal input from the A/D conversion unit 240 (step S3).

Next, the signal detection unit 253 detects a position of the interpolation signal by detecting, as the second reference signal, a sound signal with the highest correlation with the first reference signal in the sound signal excluding a sound signal corresponding to the second section (step S4). For example, in FIG. 2, an end position of the second reference signal (see the time t4) is detected as a start position of the interpolation signal (see the time t4). The second reference signal has the same time length as the first reference signal.

The interpolation signal detection unit 254 detects, as the interpolation signal, a sound signal that follows the second reference signal detected by the signal detection unit 253 and has the same time length as the first section in the sound signal input from the A/D conversion unit 240.

Here, the second reference signal detected by the signal detection unit 253 has a high correlation with the first reference signal. Accordingly, a level of the sound signal (voltage value) corresponding to an end time of the first reference signal (e.g., the time t7 in FIG. 2) has a high correlation with a level of the sound signal corresponding to an end time of the second reference signal (e.g., the time t4 in FIG. 2).

Since the level of the sound signal is continuous in terms of time, the level of the sound signal corresponding to the end time (e.g., the time t7 in FIG. 2) of the first reference signal is substantially the same as the level of the sound signal corresponding to a start time of the first section (e.g., the time t7 of FIG. 2).

Further, since the level of the sound signal is continuous in terms of time, the level of the sound signal corresponding to the end time of the second reference signal (e.g., the time t4 in FIG. 2) is substantially the same as the level of the sound signal corresponding to the start time of the interpolation signal (e.g., the time t4 in FIG. 2).

Accordingly, the level of the sound signal corresponding to the start time of the first section (e.g., the time t7 in FIG. 2) is substantially the same as the level of the sound signal corresponding to the start time of the interpolation signal (e.g., the time t4 in FIG. 2). Accordingly, even though the sound signal in the first section is replaced with the interpolation signal, auditory disharmony is small because the level of the sound signal corresponding to the start time of the first replaced section is the same as the level of the sound signal directly before the first section and the level of the sound signal is continuous.

Next, the signal replacement unit 255 replaces the sound signal in the first section with the interpolation signal (step S6). Thereafter, the recording unit 256 records the sound signal replaced by the signal replacement unit 255 or the sound signal processed by the signal processing unit 257 in the storage medium 200.

As described above, the sound recording device of the present embodiment defines a loss section of the sound signal as the first section and a sound signal following the sound signal in the first section as the first reference signal, and detects the second reference signal, which is a sound signal with a high correlation with that reference signal. The sound recording device detects an interpolation signal that is a sound signal that follows the second reference signal and has the same relative position relationship between the sound signal in the first section and the first reference signal as for the second reference signal. The sound signal in the first section, i.e., the sound signal in the loss section, is replaced with the interpolation signal.

This interpolation signal is the same for the second reference signal having a similar relative positional relationship between the sound signal in the first section and the first reference signal, to the first reference signal. Accordingly, the interpolation signal is highly likely to be closer to a target sound in the first section than a simple sound signal before and after the first section. The sound recording device of the present embodiment replaces the loss section of the sound signal with the interpolation signal that is highly likely to be close to the target sound in the first section. Accordingly, it is possible to reduce auditory disharmony in comparison with the case in which the loss section is replaced with the sound signal before and after the loss section.

The target sound noted herein is an ideal sound signal without noise superimposed thereon or without loss, for the recorded sound signal.

In FIG. 2, for example, corresponding to a section in which the signal A becomes high, the noise caused by the operation of the operation unit is highly likely to be superimposed on the sound signal (signal O) (generated).

For example, when noise is generated in response to a switch included in the manipulation unit 180 being manipulated, the time at which the switch is manipulated may not be coincide with the time at which noise is generated.

For example, the timing when noise is generated, i.e., a section in which noise is generated in the signal O of FIG. 2, may be longer than the section in which the signal A of FIG. 2 becomes high in response to the timing when the switch is manipulated, i.e., in response to the switch being manipulated.

However, there is a possibility that the relationship between the section in which the signal A of FIG. 2 is high in response to the switch being manipulated and the timing when noise is generated, i.e., the section in which noise is generated in the signal O of FIG. 2, is substantially constant. Further, this relationship may differ for each type of operation unit, such as the zoom lens 114, the VR lens 113, the AF lens 112, or the manipulation unit 180, described above.

For each type of operation unit, a time relationship between a section in which the operation unit is operated and a section in which noise is actually generated in the sound signal is stored in the storage unit 160 in advance. The time relationship may be measured in advance or obtained by simulation in advance.

The section setting unit 251 may set the first section including the section in which the operation unit operates, in the sound signal input from the A/D conversion unit 240, based on the timing detected by the timing detection unit 191, as follows.

First, the timing detection unit 191 detects when the operation unit included in the imaging device 100 operates, and outputs information indicating the type of operation unit together with the detected timing to the section setting unit 251.

The section setting unit 251 reads the time relationship according to the type of operation unit from the storage unit 160. The section setting unit 251 sets the first section including the section in which the operation unit operates in the sound signal input from the A/D conversion unit 240 based on the read time relationship and the timing detected by the timing detection unit 191.

Thus, even when the section in which the operation unit is operated does not necessarily coincide with the section in which noise is generated in the sound signal, the section setting unit 251 may properly set the first section including the section in which the operation unit operates, which is the first section in which noise is highly likely to be actually generated.

<Second Embodiment>

In the first embodiment described above, the interpolation signal is detected in the sound signal before the first section set by the section setting unit 251, and the sound signal in the first section is replaced with the interpolation signal.

On the other hand, in a second embodiment, an interpolation signal is detected in the sound signal after the first section set by the section setting unit 251, and the sound signal in the first section is replaced with the interpolation signal.

In the second embodiment, the reference signal determination unit 252, the signal detection unit 253, and the interpolation signal detection unit 254 are changed as described below. In the description of each embodiment, only a difference with the first embodiment will be described.

The reference signal determination unit 252 determines, as a third reference signal, a sound signal corresponding to a third section that is after the first section in the sound signal and is continuous to the first section.

The signal detection unit 253 detects, as a fourth reference signal, a sound signal with the highest correlation with the third reference signal in the section after the third section in the sound signal.

The interpolation signal detection unit 254 detects, as an interpolation signal, a sound signal that is continuous before the fourth reference signal and has the same time length as the first section.

The interpolation signal detected in the second embodiment is the same for the fourth reference signal having a similar relative position relationship between the sound signal in the first section and the third reference signal, to the third reference signal, similar to the interpolation signal detected in the first embodiment. Accordingly, the interpolation signal is highly likely to be closer to a target sound in the first section than the sound signal before and after the first section.

Even in the second embodiment, the sound signal in the first section, i.e., the sound signal in the loss section, is replaced with the same interpolation signal as that in the first embodiment.

Accordingly, the sound recording device according to the second embodiment can reduce auditory disharmony in comparison with the case in which the loss section of the sound signal is simply replaced with the sound signal before and after the loss section, similar to the sound recording device according to the first embodiment.

<Third Embodiment>

In the first embodiment described above, the interpolation signal is detected in the sound signal before the first section set by the section setting unit 251. In the second embodiment, the interpolation signal is detected in the sound signal after the first section set by the section setting unit 251.

In a third embodiment, two interpolation signals are combined (summed) to generate the interpolation signal, and the sound signal in the first section, i.e., the sound signal in the loss section is replaced based on the generated interpolation signal. An example of a method of combining (summing) the two interpolation signals will be described in first to fifth examples.

Here, the interpolation signal detected in the first embodiment described above, which is the interpolation signal detected in the sound signal before the first section set by the section setting unit 251, is defined as "an interpolation signal based on the second reference signal."

Further, the interpolation signal detected in the second embodiment, which is the interpolation signal detected in the sound signal after the first section set by the section setting unit 251, is defined as "an interpolation signal based on the fourth reference signal."

Further, a correlation coefficient between the second reference signal detected by the signal detection unit 253 and the first reference signal is defined as "a first correlation coefficient" and a correlation coefficient between the fourth reference signal detected by the signal detection unit 253 and the third reference signal is defined as "a second correlation coefficient."

FIRST EXAMPLE

In a first example of the third embodiment, the signal replacement unit 255 replaces the sound signal in the first section in the sound signal input from the A/D conversion unit 240 with an interpolation signal obtained by averaging the interpolation signal based on the second reference signal and the interpolation signal based on the fourth reference signal.

Using the configuration, in the first example of the third embodiment, the sound signal in the first section is replaced with the interpolation signal obtained by averaging the interpolation signal based on the second reference signal and the interpolation signal based on the fourth reference signal.

Because the interpolation signal is an average of the two interpolation signals, the interpolation signal according to the first example of the third embodiment is more highly likely to be close to the sound signal in the first section (target sound) than that the interpolation signal based on the second reference signal or the interpolation signal based on the fourth reference signal are so, i.e., the interpolation signal according to the first embodiment or the interpolation signal according to the second embodiment are so.

Thus, in the first example of the third embodiment in which the sound signal in the first section is replaced with the average of the two interpolation signals, it is also possible to further reduce auditory disharmony in comparison with the first or second embodiment in which the sound signal in the first section is replaced with only the interpolation signal based on the second reference signal or the interpolation signal based on the fourth reference signal.

SECOND EXAMPLE

In a second example of the third embodiment, the signal replacement unit 255 replaces the sound signal in the first section in the sound signal input from the A/D conversion unit 240 with an interpolation signal obtained by weighting the interpolation signal based on the second reference signal and the interpolation signal based on the fourth reference signal by the first correlation coefficient and the second correlation coefficient and averaging the resultant interpolation signals.

Using the configuration, in the second example of the third embodiment, the sound signal in the first section is replaced with an interpolation signal which is not obtained by simply averaging the interpolation signal based on the second reference signal and the interpolation signal based on the fourth reference signal, but is obtained by weighting the interpolation signals by the first correlation coefficient and the second correlation coefficient, which are respective correlation coefficients, and averaging the resultant interpolation signals.

The interpolation signal obtained by weighting the two interpolation signals by the first correlation coefficient and the second correlation coefficient and averaging the resultant interpolation signals is highly likely to be closer to the sound signal in the first section (target sound) than the interpolation signal obtained by simply averaging the two interpolation signals.

Accordingly, in the second example of the third embodiment described herein, it is also possible to further reduce auditory disharmony, in comparison with the first example of the third embodiment in which the sound signal in the first section is replaced with the interpolation signal obtained by simply averaging the interpolation signal based on the second reference signal and the interpolation signal based on the fourth reference signal.

THIRD EXAMPLE

In a third example of the third embodiment, the signal replacement unit 255 replaces the sound signal in the first section with the interpolation signal based on the second reference signal when the first correlation coefficient is greater than or equal to the second correlation coefficient, and replaces the sound signal in the first section with the interpolation signal based on the fourth reference signal when the first correlation coefficient is smaller than the second correlation coefficient.

Using the configuration, in the third example of the third embodiment, the sound signal in the first section is replaced with the interpolation signal with a greater correlation coefficient among the interpolation signal based on the second reference signal and the interpolation signal based on the fourth reference signal.

The interpolation signal according to the third example of the third embodiment is the interpolation signal with a greater correlation coefficient among the interpolation signal based on the second reference signal and the interpolation signal based on the fourth reference signal. Accordingly, the interpolation signal according to the third example of the third embodiment described herein is highly likely to be closer to the sound signal in the first section (target sound) than any one of the interpolation signal based on the second reference signal and the interpolation signal based on the fourth reference signal, i.e., the interpolation signal according to the first embodiment and the interpolation signal according to the second embodiment.

Accordingly, the third example of the third embodiment in which the sound signal in the first section is replaced with the interpolation signal with a greater correlation coefficient among the interpolation signal based on the second reference signal and the interpolation signal based on the fourth reference signal is capable of further reducing auditory disharmony than the first embodiment or the second embodiment in which the sound signal in the first section is replaced with the interpolation signal based on the second reference signal or the interpolation signal based on the fourth reference signal.

FOURTH EXAMPLE

In the fourth example of the third embodiment, when the first correlation coefficient is greater than or equal to the second correlation coefficient and a difference between the first correlation coefficient and the second correlation coefficient is greater than the first previously determined threshold value, the signal replacement unit 255 replaces the sound signal in the first section with the interpolation signal based on the second reference signal.

Further, when the first correlation coefficient is smaller than the second correlation coefficient and the difference between the second correlation coefficient and the first correlation coefficient is greater than the first threshold value described above, the signal replacement unit 255 replaces the sound signal in the first section with the interpolation signal based on the fourth reference signal.

Otherwise, in a case other than the above-mentioned two cases, the signal replacement unit 255 replaces the sound signal in the first section in the sound signal with the interpolation signal obtained by averaging the interpolation signal based on the second reference signal and the interpolation signal based on the fourth reference signal.

In the fourth example of the third embodiment, when the difference between the first correlation coefficient and the second correlation coefficient is greater than the first threshold value, i.e., when only any one of the interpolation signal based on the second reference signal and the interpolation signal based on the fourth reference signal is highly likely to be a suitable interpolation signal, the sound signal in the first section is replaced with the interpolation signal with a greater correlation coefficient among the interpolation signal based on the second reference signal and the interpolation signal based on the fourth reference signal. In this case, the same effects as those of the third example of the third embodiment are achieved.

When the difference between the first correlation coefficient and the second correlation coefficient is less than or equal to the first threshold value, i.e., when both of the interpolation signal based on the second reference signal and the interpolation signal based on the fourth reference signal are highly likely to be suitable interpolation signals, the sound signal in the first section is replaced with the interpolation signal obtained by averaging the two interpolation signals. In this case, the same effects as those of the first example of the third embodiment described above are achieved.

Accordingly, according to the fourth example of the third embodiment, even when only one of the interpolation signal based on the second reference signal and the interpolation signal based on the fourth reference signal is highly likely to be a suitable interpolation signal or when both are highly likely to be suitable interpolation signals, the sound signal in the first section can be replaced with the interpolation signal suitable for each case.

Accordingly, according to the fourth example of the third embodiment, it is possible to reduce auditory disharmony even in any case described above.

FIFTH EXAMPLE

When the signal replacement unit 255 in a fifth example of the third embodiment replaces the sound signal in the first section in the sound signal input from the A/D conversion unit 240 with the interpolation signal obtained by averaging the interpolation signal based on the second reference signal and the interpolation signal based on the fourth reference signal, the signal replacement unit 255 replaces the sound signal in the first section in the sound signal input from the A/D conversion unit 240 with the interpolation signal obtained by weighting the interpolation signal based on the second reference signal and the interpolation signal based on the fourth reference signal by the first correlation coefficient and the second correlation coefficient and averaging the resultant interpolation signals, unlike the fourth example of the third embodiment described above.

Accordingly, in the fourth example of the third embodiment described above, when both of the interpolation signal based on the second reference signal and the interpolation signal based on the fourth reference signal are highly likely to be suitable interpolation signals, the same effects as those of the second example relative to the first example of the third embodiment described above are achieved.

That is, the sound signal in the first section is replaced with the interpolation signal obtained by weighting the interpolation signal based on the second reference signal and the interpolation signal based on the fourth reference signal by the respective correlation coefficients and averaging the resultant interpolation signals, thus further reducing auditory disharmony, in comparison with the fourth example of the third embodiment in which the sound signal in the first section is replaced with the interpolation signal obtained by simply averaging the interpolation signal based on the second reference signal and the interpolation signal based on the fourth reference signal.

In any of the first to third embodiments and the first and fifth examples of the third embodiment described above, the sound recording device of the present embodiment replaces the sound signal in the loss section (the first section) of the sound signal with the interpolation signal that is highly likely to be close to the target sound of the loss section (the first section) of the sound signal. Accordingly, it is possible to reduce auditory disharmony, in comparison with the case in which the sound signal in the loss section is simply replaced with the sound signal before and after the loss section.

In the description using FIG. 2, the section from which the second reference signal is retrieved may be a section before the time t5 and may have a time length including all sound signals before the time t5, but since a sound signal with a high correlation with the first reference signal is highly likely to be in the vicinity of the first reference signal, several to tens of times the time length of the second section is preferable, as described.

The retrieval period may be dynamically set, for example, using the first correlation coefficient described above, as follows.

For example, when the interpolation signal is detected in the sound signal before the first section set by the section setting unit 251 as in the first embodiment, the first correlation coefficient is calculated in order in a forward direction from the first set section in the sound signal, i.e., in a direction away from the first set section.

When a maximum value of the first correlation coefficient increases, for example, in order and begins to be reduced, a section of a sound signal corresponding to a maximum value directly before the maximum value begins to be reduced is determined as the second reference signal described above. Thus, the section from which the second reference signal is retrieved need not be set in advance and a second more suitable reference signal can be retrieved by small number of retrieval.

The maximum value of the first correlation coefficient noted herein is, for example, a maximum value of the first correlation coefficient for the times t3 to t4 of FIG. 2 and the first correlation coefficient for times t1 to t2.

Herein, the case in which the interpolation signal is detected in the sound signal before the first section set by the section setting unit 251, as in the first embodiment, has been described. However, even in the case in which the interpolation signal is detected in the sound signal after the first section set by the section setting unit 251 in the sound signal as in the second embodiment, the second correlation coefficient is calculated in order in a backward direction from the first set section, i.e., in a direction away from the first set section, similar to the first embodiment.

The third reference signal described above is determined based on the second calculated correlation coefficient, similar to the first embodiment. Thus, a section from which the third reference signal is retrieved need not be set in advance, and the third more suitable reference signal can be retrieved by a small retrieval number.

Here, when the interpolation signal is detected in the sound signal before the first section set by the section setting unit 251 as described using FIG. 2, a plurality of sound signals in which the first correlation coefficient is maximized may be detected as candidates of the second reference signal, like the sound signal for the times t3 to t4 of FIG. 2 or the sound signal for the times t1 to t2.

Thus, when there are a plurality of second reference signal candidates, the interpolation signal detection unit 254 may simply select, as the interpolation signal, the interpolation signal candidate with the first greatest correlation coefficient, as described above, among the interpolation signal detected based on a plurality of second reference signals, i.e., the interpolation signal candidates.

Further, the signal detection unit 253 may use the plurality of interpolation signal candidates as the interpolation signal based on the second reference signal and the interpolation signal based on the fourth reference signal described in the third embodiment, and may combine (sum) the plurality of interpolation signal candidates to generate the interpolation signal, similar to the first to fifth examples of the third embodiment described above.

Thus, the signal detection unit 253 can detect a more suitable interpolation signal, as in the first to fifth examples of the third embodiment. Accordingly, it is possible to further reduce auditory disharmony in the sound signal.

Even in the second embodiment in which the interpolation signal is detected in the sound signal after the first set section, the signal detection unit 253 may combine (sum) the plurality of interpolation signal candidates to generate the interpolation signal, similar to the first embodiment in which the interpolation signal is detected in the sound signal before the first set section as shown in FIG. 2.

While the case in which the sound signal processing unit 250 performs signal processing on the sound signal received by the microphone 230 has been described, the above-described processing of the sound signal processing unit 250 according to the present embodiment may be applied to signals other than the sound signal received in real time.

For example, even when the timing indicating that the operation unit included in the device that has recorded the sound signal operates is recorded, for example, in a storage unit such as the storage medium 200 to be related to the previously recorded sound signal, the sound signal processing unit 250 according to the present embodiment may similarly execute the above-described signal processing for the previously recorded sound signal.

The sound signal processing unit 250 in FIG. 1 or each unit included in the sound signal processing unit 250 may be realized by dedicated hardware or may be realized by a memory unit and a microprocessor.

The sound signal processing unit 250 or each unit included in the sound signal processing unit 250 may be realized by dedicated hardware, or the sound signal processing unit 250 or each unit included in the sound signal processing unit 250 may be configured of a memory unit and a CPU. A program for realizing the function of the sound signal processing unit 250 or each unit included in the sound signal processing unit 250 may be loaded in a memory unit to realize the function.

Further, the program for realizing the function of the sound signal processing unit 250 in FIG. 1 or each unit included in the sound signal processing unit 250 may be recorded in a computer-readable recording medium, and the program recorded in the recording medium may be read and executed by a computer system, such that the process in the sound signal processing unit 250 or each unit included in the sound signal processing unit 250 can be performed. The "computer system" noted herein is assumed to include an OS or hardware such as peripheral devices.

<Fourth Embodiment>

A fourth embodiment of the present invention will be described in detail with reference to the accompanying drawings. Hereinafter, the same or equivalent components as those in the above embodiments are denoted by the same reference numerals and a description thereof will be omitted or simplified.

Figure 5:
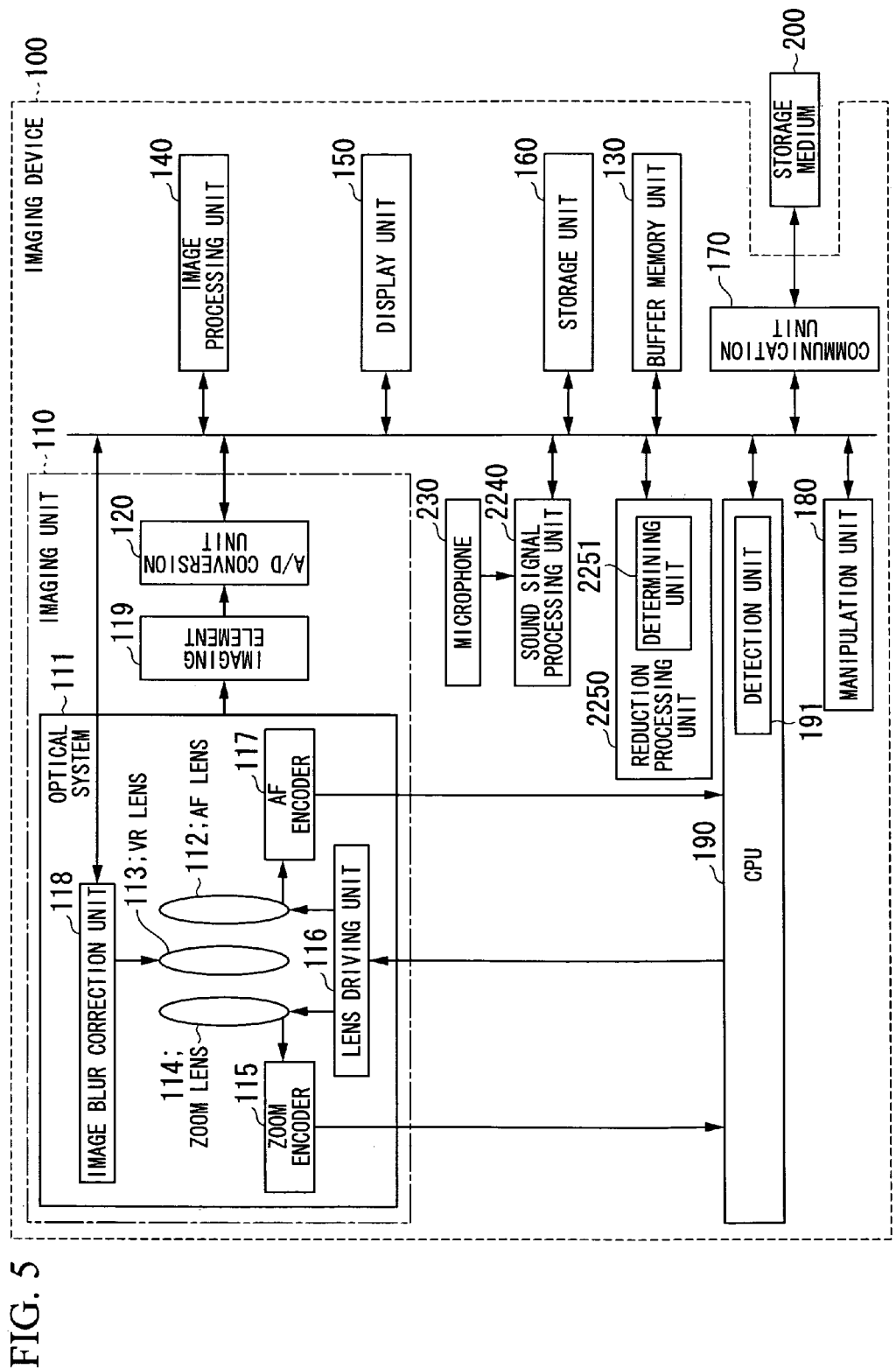
FIG. 5 is a block diagram showing a configuration of an imaging device in a fourth embodiment of the present invention.

In FIG. 5, a block diagram showing a configuration of the imaging device is shown. An imaging device (photographing device) 100 acquires (photographs) an image by the optical system, and records the acquired image data in a storage medium 200. Further, the imaging device 100 reduces noise from received sound and stores an obtained sound signal in the storage medium 200.

In FIG. 5, the imaging device 100 includes an imaging unit 110, an image processing unit 140, a display unit 150, a buffer memory unit 130, a manipulation unit 180, a storage unit 160, a CPU 190, a microphone 230, and a communication unit 170, similar to FIG. 1. The imaging device 100 further includes a sound signal processing unit 2240 and a reduction processing unit 2250.

The microphone 230 receives sound, converts a sound wave of the sound into an electrical signal (analog signal), and outputs the electrical signal. That is, the microphone 230 outputs a sound signal according to the received sound (hereinafter, referred to as "a microphone output signal") to the buffer memory unit 130 via the sound signal processing unit 2240.

At least one of impact noise and driving noise is likely to be superimposed on the microphone output signal due to sound generated by an operation unit. The operation unit noted herein is, for example, for the zoom lens 114, the VR lens 113, the AF lens 112 or the manipulation unit 180 described above, and is a component from which sound is generated (or, sound is likely to be generated) when the component operates or is operated, among the components included in the imaging device 100.

Further, the operation unit is a component from which sound generated when the component operates or is operated is received (or, is likely to be received) by the microphone 230 among the components included in the imaging device 100.

The driving noise noted herein is noise normally generated in the microphone output signal in the section (period) in which the operation unit operates. The impact noise is a noise that has a greater amplitude than the driving noise and is instantaneously generated in the microphone output signal when there is a change in the photographing operation, i.e., upon operation initiation, operation termination, or reverse of the operation direction of the operation unit, or when the operation unit is manipulated.

For example, the impact noise may be a noise generated when a gear (not shown) included in the optical system 111 is engaged. Alternatively, the impact noise may be a noise generated, for example, when a mechanism of the zoom lens 114 hits an end for limiting the movement range of the zoom lens 114.

The storage unit 160 stores, for example, a determining condition referenced when a scene determining is made by the CPU 190 and an imaging condition corresponding to each scene determined by the scene determining.

The storage unit 160 also stores a signal including specific sound information (hereinafter, referred to as "an estimated noise signal") and an operation unit to correspond to each other, in advance. Here, the specific sound information may be, for example, waveform information of a previously recorded driving noise. The estimated noise signal may be a signal subjected to a Fourier transform.

The sound signal processing unit 2240 converts the microphone output signal output by the microphone 230 into a digital microphone output signal, and stores the digital microphone output signal in the buffer memory unit 130.

The CPU 190 controls the entire imaging device and, for example, controls the imaging unit 110 according to a set imaging condition (e.g. an aperture value or an exposure value). Further, the CPU 190 generates a control signal to control the positions of the zoom encoder 115 and the AF encoder 117 based on a zoom position that is input from the zoom encoder 115, a focus position that is input from the AF encoder 117, and a manipulation input that is input from the manipulation unit 180. The CPU 190 controls the positions of the zoom encoder 115 and the AF encoder 117 via the lens driving unit 116 based on the control signal.

Further, the CPU 190 includes a detection unit 191. The detection unit 191 detects a timing when the operation unit included in the imaging device 100 operates. The detection unit 191 may detect the timing when the operation unit operates, based on the control signal to operate the operation unit. The control signal is a control signal to cause a driving unit for operating the operation unit to operate the operation unit, or a control signal to drive the driving unit.

For example, the detection unit 191 may detect the timing when the operation unit operates based on the control signal input to the lens driving unit 116 or the image blur correction unit 118, or based on the control signal generated by the CPU 190 to drive the zoom lens 114, the VR lens 113, or the AF lens 112.

When the CPU 190 generates the control signal, the detection unit 191 may detect the timing when the operation unit operates based on a process or a command executed in the CPU 190.

Alternatively, the detection unit 191 may detect the timing when the operation unit operates based on a signal input from the manipulation unit 180 indicating that the zoom lens 114 or the AF lens 112 is driven.

Alternatively, the detection unit 191 may detect the timing when the operation unit operates based on a signal indicating that the operation unit is operated.

For example, the detection unit 191 may detect the timing when the operation unit operates by detecting that the zoom lens 114 or the AF lens 112 is driven based on the output of the zoom encoder 115 or the AF encoder 117.

Alternatively, the detection unit 191 may detect the timing when the operation unit operates by detecting that the VR lens 113 is driven based on the output from the image blur correction unit 118.

Alternatively, the detection unit 191 may detect the timing when the operation unit operates by detecting that the manipulation unit 180 is manipulated based on the input from the manipulation unit 180.

The detection unit 191 detects the timing when the operation unit included in the imaging device 100 operates and outputs a signal indicating the timing to the determining unit 2251 of the reduction processing unit 2250, which will be described below.

Next, the reduction processing unit 2250 will be described in detail.

The reduction processing unit 2250 includes a determining unit 2251. The determining unit 2251 determines whether there is a change in the photographing operation based on the signal indicating the timing. When the determining unit 2251 determines that there is a change in the photographing operation and when the determining unit 2251 does not determine that there is a change in the photographing operation, the reduction processing unit 2250 makes a process of reducing an impact noise and that of reducing a driving noise different. For example, when it is determined that impact sound is generated based on the signal indicating the timing, the determining unit 2251 may determine that there is a change in the photographing operation. Further, when it is determined that normal sound is generated based on the signal indicating the timing, the determining unit 2251 may determine that the photographing operation is not changed. Based on the information indicating the timing, the determining unit 2251 may also determine that the noise is not generated when the determining unit 2251 can determine that the photographing operation is not performed, or when the determining unit 2251 can determine that neither the impact sound nor normal sound is generated.

Specifically, the reduction processing unit 2250 executes a noise reduction process in the time domain, which is different according to the determining, for the impact noise, and reduces the impact noise. Meanwhile, the reduction processing unit 2250 executes the noise reduction process in the frequency domain for driving noise, for example, using the spectrum subtraction method, to reduce the driving noise. The reduction processing unit 2250 outputs the noise-reduced microphone output signal as a noise-subtraction-processed signal (sound data) to the communication unit 170.

The communication unit 170 is connected to a detachable storage medium 200 such as a card memory, and writes, reads, or deletes information (e.g. the image data, and the noise-subtraction-processed signal) to or from the storage medium 200.

The storage medium 200 is a storage unit detachably connected to the imaging device 100 and stores, for example, the image data generated by the imaging unit 100, and the noise-subtraction-processed signal. The storage medium 200 may be provided integrally with the imaging device 100.

Next, a relationship between the timing when the AF lens 112 operates, as one example of the timing when the operation unit operates, and an impact noise and a driving noise generated in the microphone output signal will be described.

Figure 6:
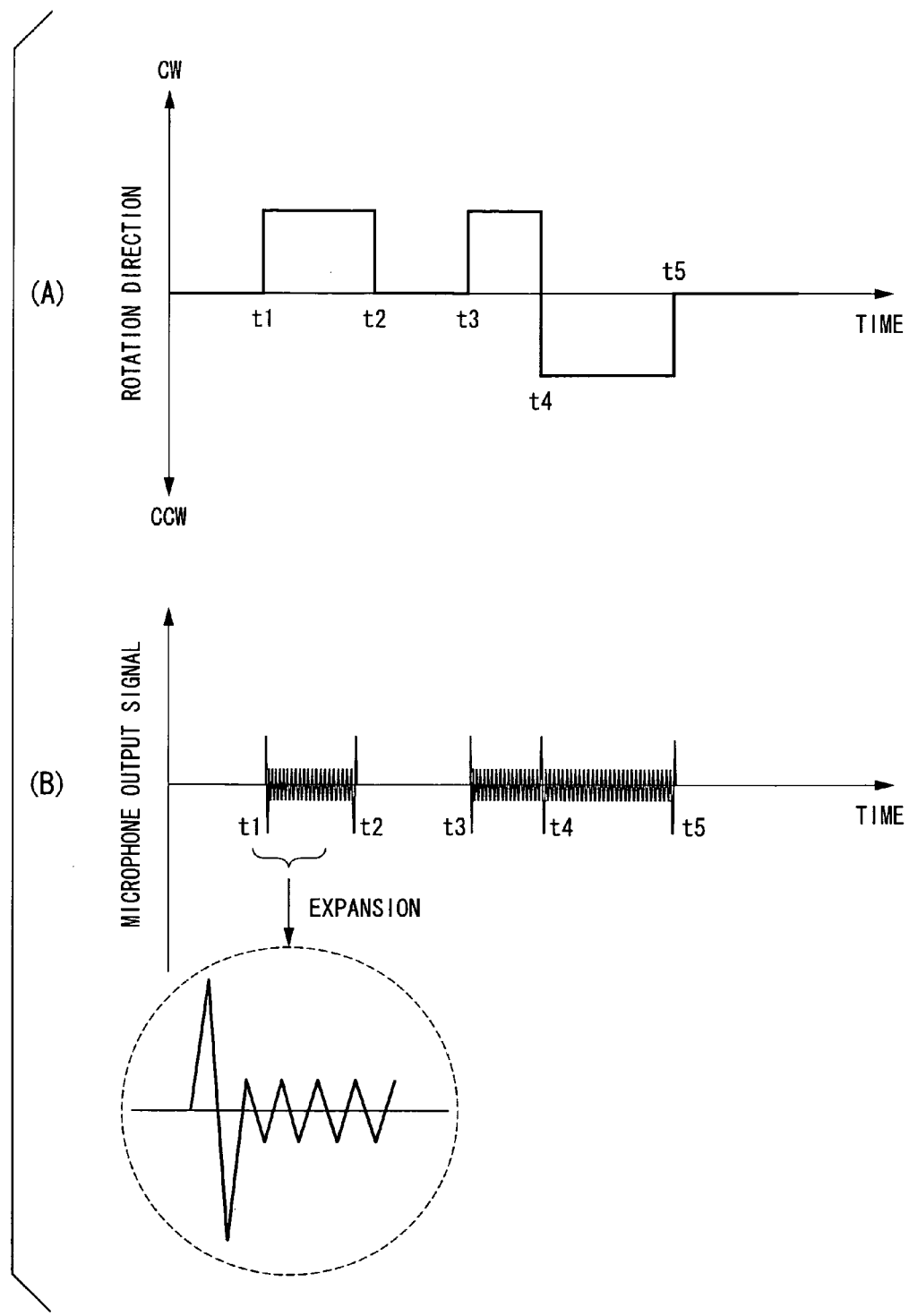
FIG. 6 is a diagram showing one example of an output of an AF encoder in the fourth embodiment of the present invention and one example of an impact noise and a driving noise generated in a microphone output signal.

In FIG. 6, one example of the output of the AF encoder and one example of the impact noise and the driving noise generated in the microphone output signal are shown. In FIGS. 6(A) and 6(B), a horizontal axis indicates time. In FIG. 6(A), a vertical axis indicates the output of the AF encoder, which indicates a drive direction of the AF lens 112. That is, the vertical axis indicates that the AF lens 112 as the operation unit is in any of a stop state in the optical system 111, a state of driving in an infinite-end direction (a motor, a cam or the like for driving the AF lens 112 are rotated, for example, in clockwise (CW)), or a state of driving in a near-end direction (the motor, the cam or the like for driving the AF lens 112 are rotated, for example, in counter clockwise (CCW)). In FIG. 6(B), a vertical axis indicates the microphone output signal output by the microphone 230.

For example, the motor, the cam or the like for driving the AF lens 112 are changed from a stop state to a CW rotation (driving initiation) at a time t1 (see FIG. 6(A)). Accordingly, the impact noise is generated in the microphone output signal, and then, the driving noise is generated, as shown in FIG. 6(B). The motor, the cam or the like for driving the AF lens 112 continue to be rotated (driven) and stop (driving termination) in a time t2. Accordingly, the impact noise is generated in the time t2, as shown in FIG. 6(B).

For example, the motor, the cam or the like for driving the AF lens 112 are changed from the stop state to the CW rotation (driving initiation) in a time t3 (see FIG. 6(A)). Accordingly, the impact noise is generated in the microphone output signal in the time t3 and then, the driving noise is generated, as shown in FIG. 6(B). The motor, the cam or the like for driving the AF lens 112 continue to be rotated (driven) and the rotation direction (driving direction) is reversed in a time t4. Accordingly, the impact noise is generated in the time t4, as shown in FIG. 6(B). Further, the motor, the cam or the like for driving the AF lens 112 continue to be rotated (driven) and stop (driving termination) in a time t5. Accordingly, the impact noise is generated in the time t5, as shown in FIG. 6(B).

As in one example shown in FIG. 6, the impact noise and the driving noise caused by the AF lens 112 are generated in synchronization with timings (t1, t2, t3, t4 and t5) when the AF lens 112 operates. The detection unit 191 detects the timing (t1, t2, t3, t4 and t5) when the AF lens 112 operates and outputs a signal indicating the timing to the determining unit 2251. Further, the determining unit 2251 determines whether there is a change in the photographing operation at timings (t1, t2, t3, t4 and t5) based on the signal indicating the timings. Similarly, the determining unit 2251 determines that the driving noise (normal sound) is generated in the times t1 to t2, t3 to t4, and t4 to t5 and the photographing operation is not changed, based on the signal indicating the timing. Similarly, the determining unit 2251 determines that driving stops in the times t2 to t3 (the photographing operation is not performed) and the noise is not generated, based on the signal indicating the timing.

Next, a noise reduction process will be described in detail.

Hereinafter, in the fourth embodiment, the sound received by the microphone 230 (microphone output signal) is assumed to have a basic period. A case in which the sound received by the microphone 230 does not have a basic period will be described below in the fifth embodiment. Hereinafter, a case in which a timing detected by the detection unit 191 is the timing when the operation unit begins to operate will be described.

Figure 7:
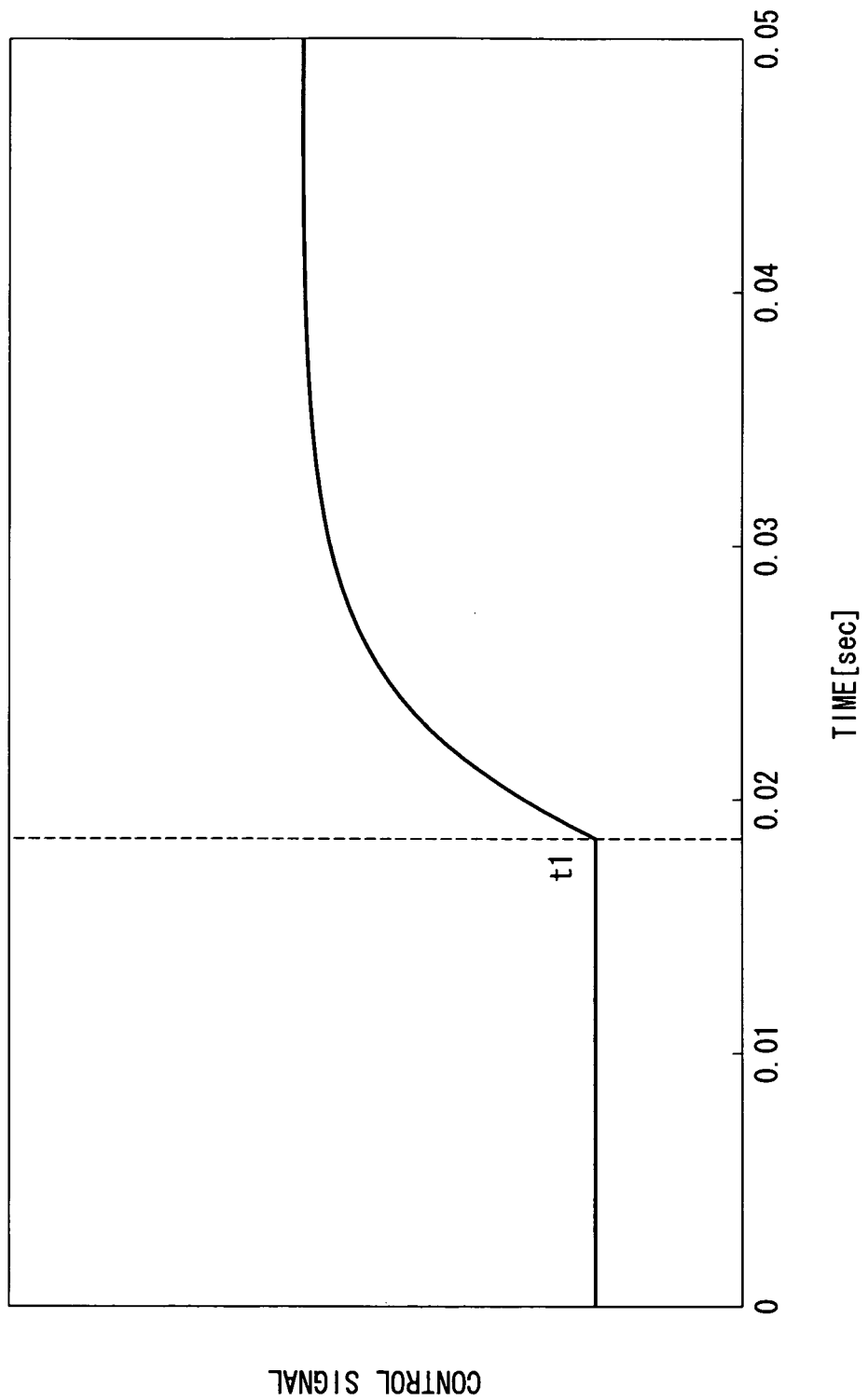
FIG. 7 is a diagram showing one example of a waveform of a control signal in the fourth embodiment of the present invention.
Figure 8:
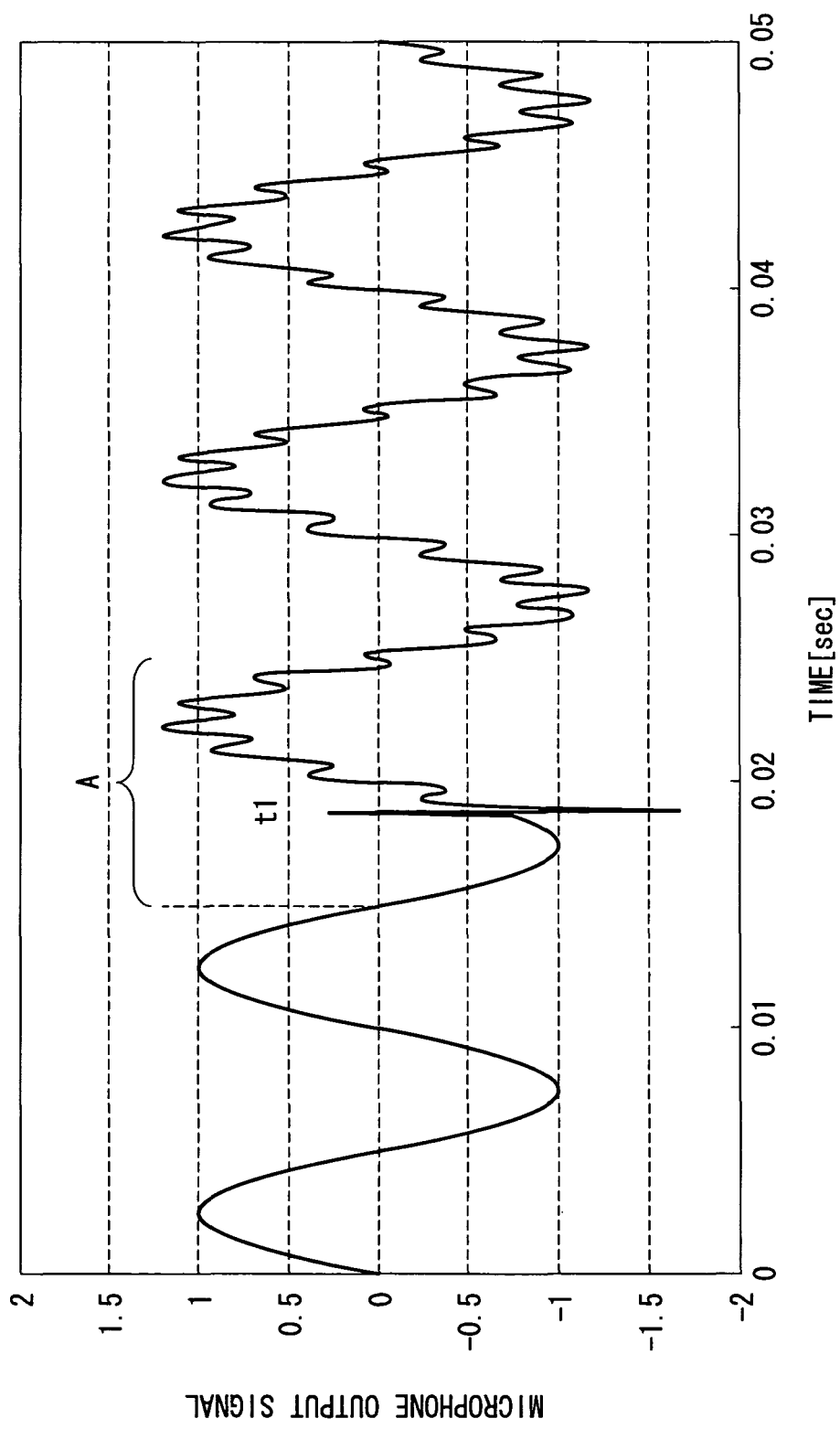
FIG. 8 is a diagram showing one example of an impact noise and a driving noise generated in a microphone output signal (periodic sound) in the fourth embodiment of the present invention.

In FIG. 7, one example of a waveform of the control signal is shown. Here, the level of the control signal rises up from the time t1. In this case, the detection unit 191 defines, for example, the time t1 at which the level of the control signal rises up as an operation initiation time t1 of the operation unit. In FIG. 8, one example of the impact noise and the driving noise generated in the microphone output signal (the periodic sound) are shown. The impact noise is generated in the microphone output signal at the time t1, similar to FIG. 7. From the time t1, the driving noise is generated in the microphone output signal in the section in which the operation unit operates.

The reduction processing unit 2250 removes the microphone output signal (a signal defined for the time axis) in the section including the timing detected by the detection unit 191 (hereinafter, referred to as "section A;" see the timings t1, t2, t3, t4 and t5 of FIG. 6(A)) in the time domain. For example, the reduction processing unit 2250 reduces all values of the microphone output signal in the section A to "0" (no sound) in order to remove the microphone output signal in the section A in the time domain.

Figure 9:
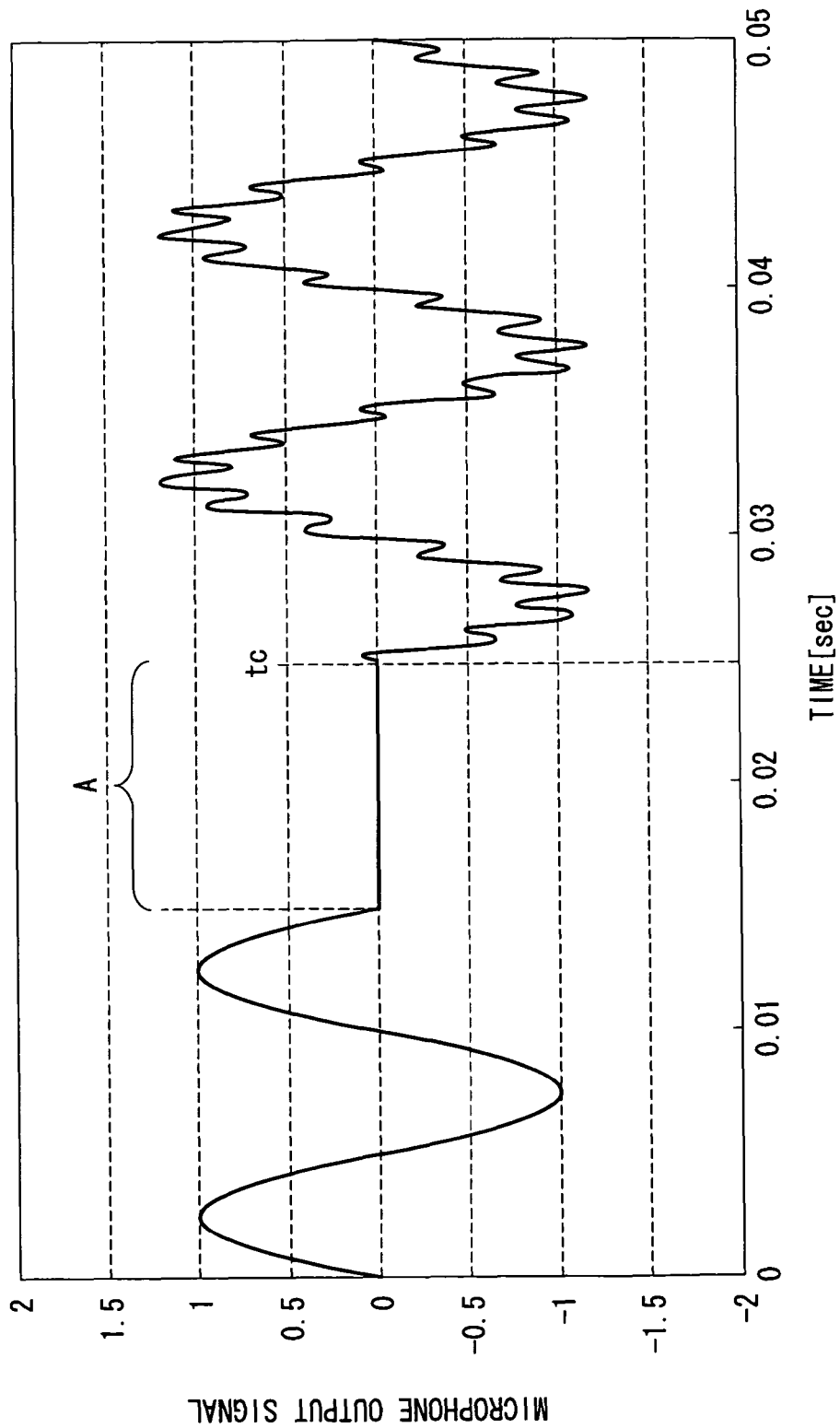
FIG. 9 is a diagram showing one example in which a microphone output signal in a section A is removed in a time domain in the fourth embodiment of the present invention.

In FIG. 9, one example in which the microphone output signal in the section A is removed in the time domain is shown. Hereinafter, an end point of the section A is a time tc. Here, the reduction processing unit 2250 may set a length of a removal section as integral multiple of the basic period of the microphone output signal. This allows the length of the removal section to be integral multiple of the wavelength of the signal interpolated in the section in a signal interpolation process, which will be described below using FIG. 10, thus facilitating the signal interpolation process.

In the present embodiment, for ease of description, a method using a period of time from a time when the amplitude of the microphone output signal is a value "0" to a time when the amplitude is a value "0" again as the basic period of the microphone output signal is used. The reduction processing unit 2250 may remove a section from the time when the amplitude of the microphone output signal is a value "0" to the time when the amplitude is a value "0" again, or a section corresponding to integral multiple of the section. By doing so, a signal interpolated in the signal interpolation process, which will be described below using FIG. 10 and a signal before and after the interpolated signal are continuous with amplitude "0," such that a discontinuity point of the signal is not created.

Methods of obtaining a basic period of the sound include an auto correlation function method, a Cepstrum method, and so on. The auto correlation function method is a method of obtaining a basic period by detecting a peak of an auto correlation function of a sound signal. Further, the Cepstrum method is a method of detecting a peak of a Cepstrum obtained by performing an inverse Fourier transform on a logarithm of a spectrum of the sound signal, and obtaining a basic period.

Figure 10:
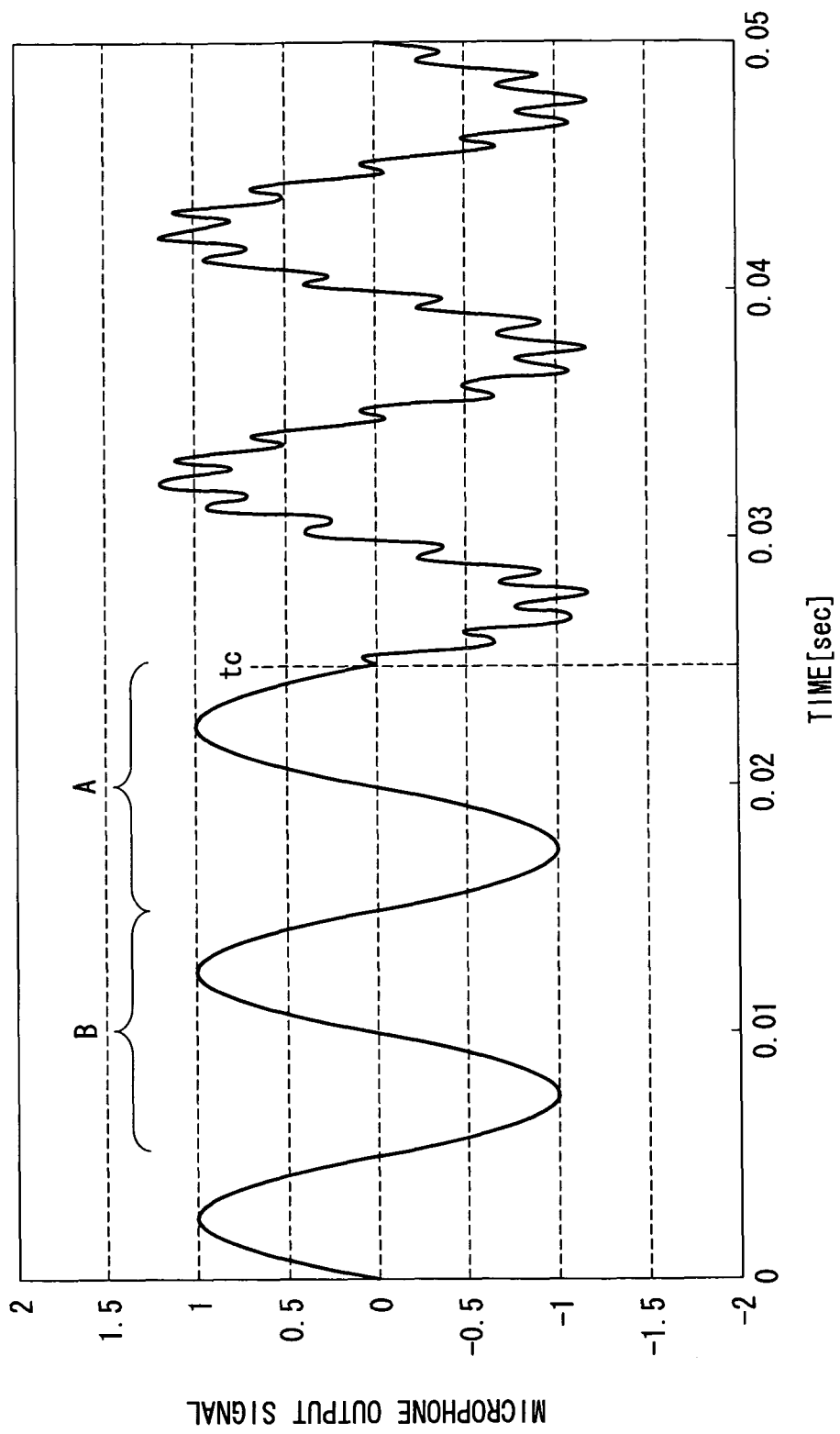
FIG. 10 is a diagram showing one example in which a microphone output signal before a section A is interpolated in the section A in the fourth embodiment of the present invention.

In FIG. 10, one example in which the microphone output signal before the section A is interpolated in the section A is shown. The reduction processing unit 2250 interpolates the microphone output signal before the section A in the section A (signal interpolation process). Here, the section of the microphone output signal interpolated in the section A (hereinafter, referred to as "section B") has the same length as the section A and is located before the section A. For example, the reduction processing unit 2250 defines the section located directly before the section A as the section B. The reduction processing unit 2250 interpolates the microphone output signal in the section B, in the section A. Thus, the reduction processing unit 2250 removes, in the time domain, the noise from the section A.

Figure 11:
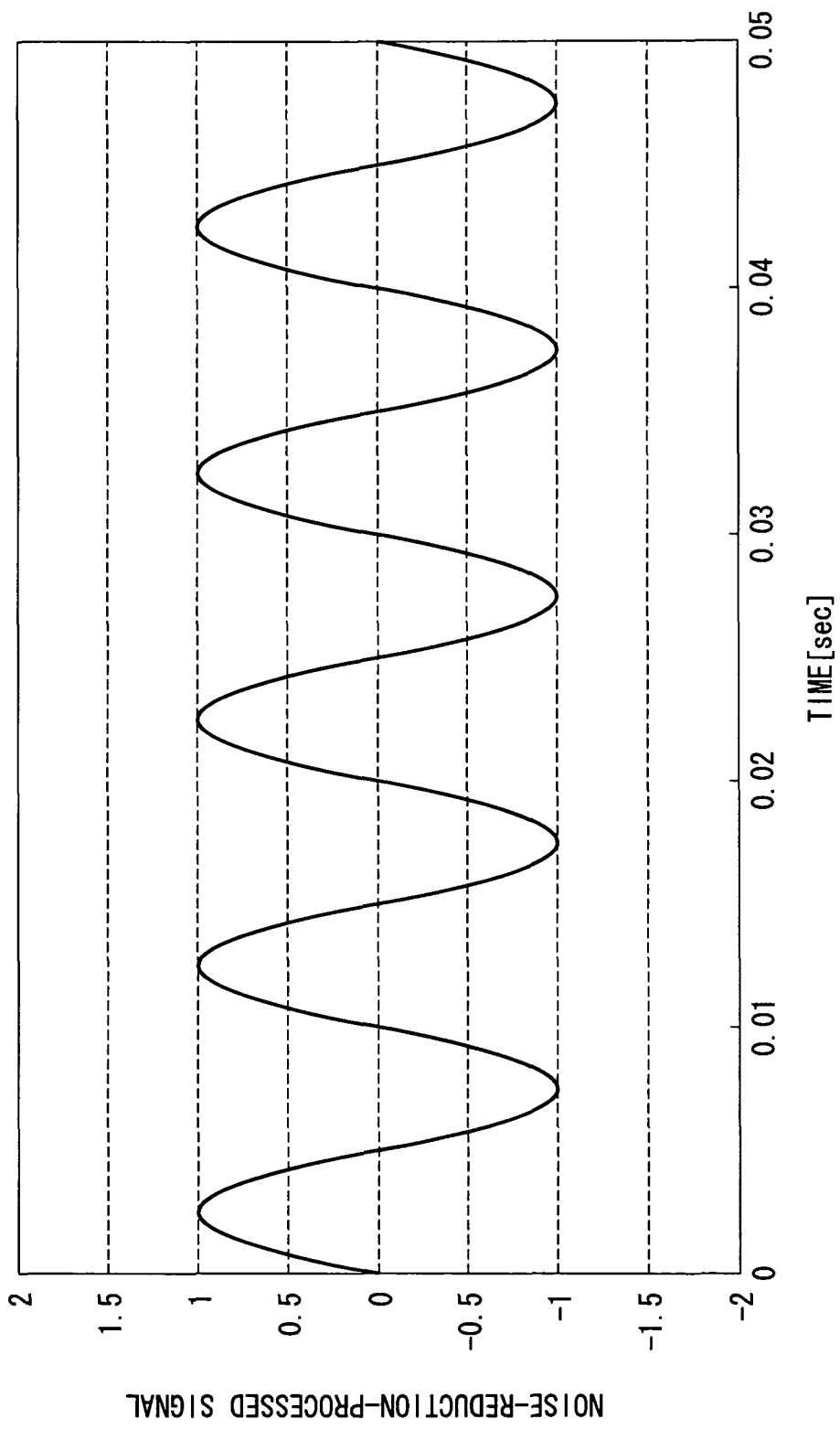
FIG. 11 is a diagram showing one example of a noise-reduction-processed signal obtained by reducing an impact noise and a driving noise from a microphone output signal in the fourth embodiment of the present invention.

Next, the reduction processing unit 2250 executes the noise reduction process in the frequency domain for the section in which the driving noise is generated (the section in which the operation unit operates since the time tc; see the timings t1 to t2, t3 to t4, and t4 to t5 in FIG. 6(A)), for example, using the spectrum subtraction method, by defining the microphone output signal as a signal defined for a frequency, and reduces the driving noise. In FIG. 11, one example of a noise-reduction-processed signal obtained by reducing the impact noise and the driving noise from the microphone output signal is shown. The reduction processing unit 2250 may execute, for the section A, the noise reduction process in the frequency domain, for example, using the spectrum subtraction method.

The reduction processing unit 2250 outputs the microphone output signal which the impact noise and the driving noise are reduced as a noise-subtraction-processed signal (sound data) to the communication unit 170. Accordingly, the noise-subtraction-processed signal is stored in the storage medium 200.

When the timing detected by the detection unit 191 is a timing when the operation unit terminates the operation, the reduction processing unit 2250 removes, in the time domain, the microphone output signal from a section including the time at which the operation unit terminates the operation, similar to the case of the section including the time at which the operation unit begins to operate. The reduction processing unit 2250 interpolates the microphone output signal in a section after the removed section, in the removed section. Further, the reduction processing unit 2250 reduces the driving noise by executing the noise reduction process in the frequency domain, for example, using the spectrum subtraction method. For the times t2 to t3 when the determining unit 2251 determines that noise is not generated, the reduction processing unit 2250 may not perform the noise reduction process.

<Regarding Subtraction Coefficient>

The reduction processing unit 2250 executes a noise subtraction process using a previously determined section as a unit of signal processing. Here, the previously determined section is a unit (frame) of signal processing, which may be a section repeated at uniform intervals. The previously determined section may overlap another previously determined section in order by half.

The reduction processing unit 2250 weights the microphone output signal by a window function for each previously determined section. Further, the reduction processing unit 2250 reduces the noise generated in the microphone output signal by subtracting, in the frequency domain, an estimated noise from the microphone output signal weighted by the window function subtraction.

Here, when noise is generated only in a portion of the section and an estimated noise is directly reduced in the section, noise may be reduced too much. Accordingly, the reduction processing unit 2250 may weight the estimated noise by a subtraction coefficient and may subtract, in the frequency domain, the weighted estimated noise from the microphone output signal weighted by the window function. The subtraction coefficient corresponding to the previously determined section is determined according to a relative position between the window function corresponding to the section and the time tc, which is the end point of the section A, as follows.

Figure 12:
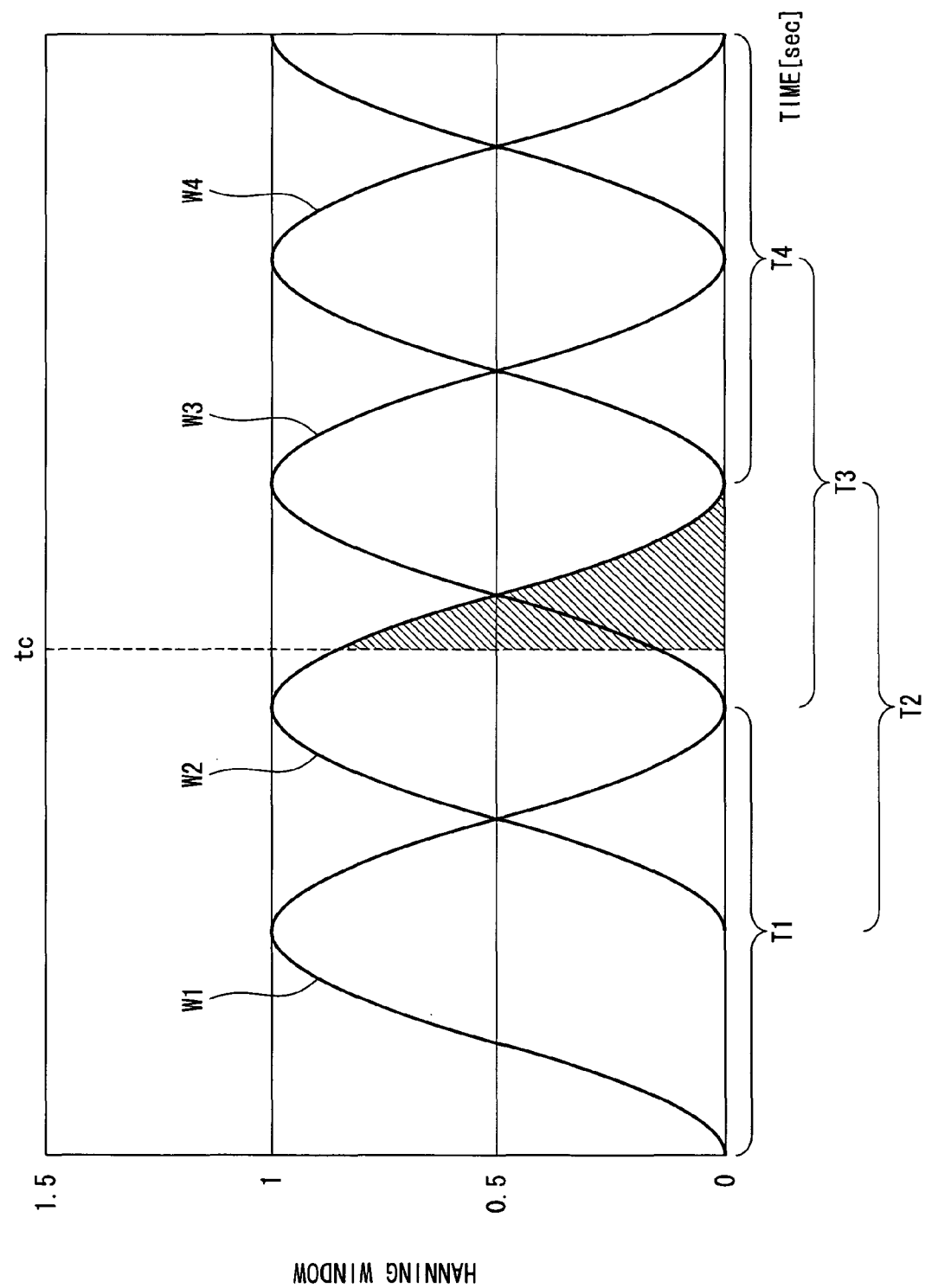
FIG. 12 is a diagram showing one example of a position relationship between a time tc, which is an end point of the section A, and a Hanning window function in the fourth embodiment of the present invention.
Figure 13:
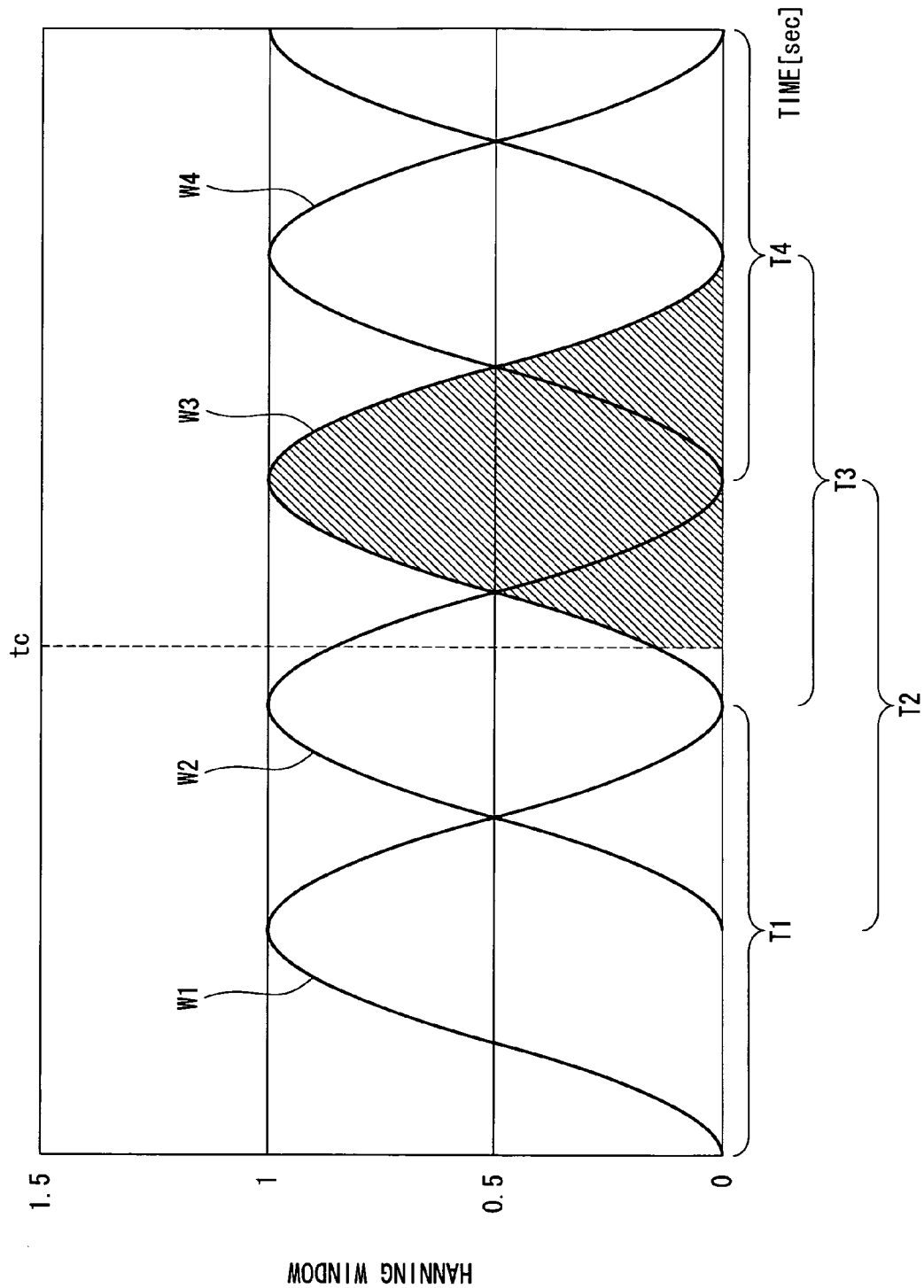
FIG. 13 is a diagram showing one example of the position relationship between the time tc, which is the end point of the section A, and the Hanning window function in the fourth embodiment of the present invention.
Figure 14:
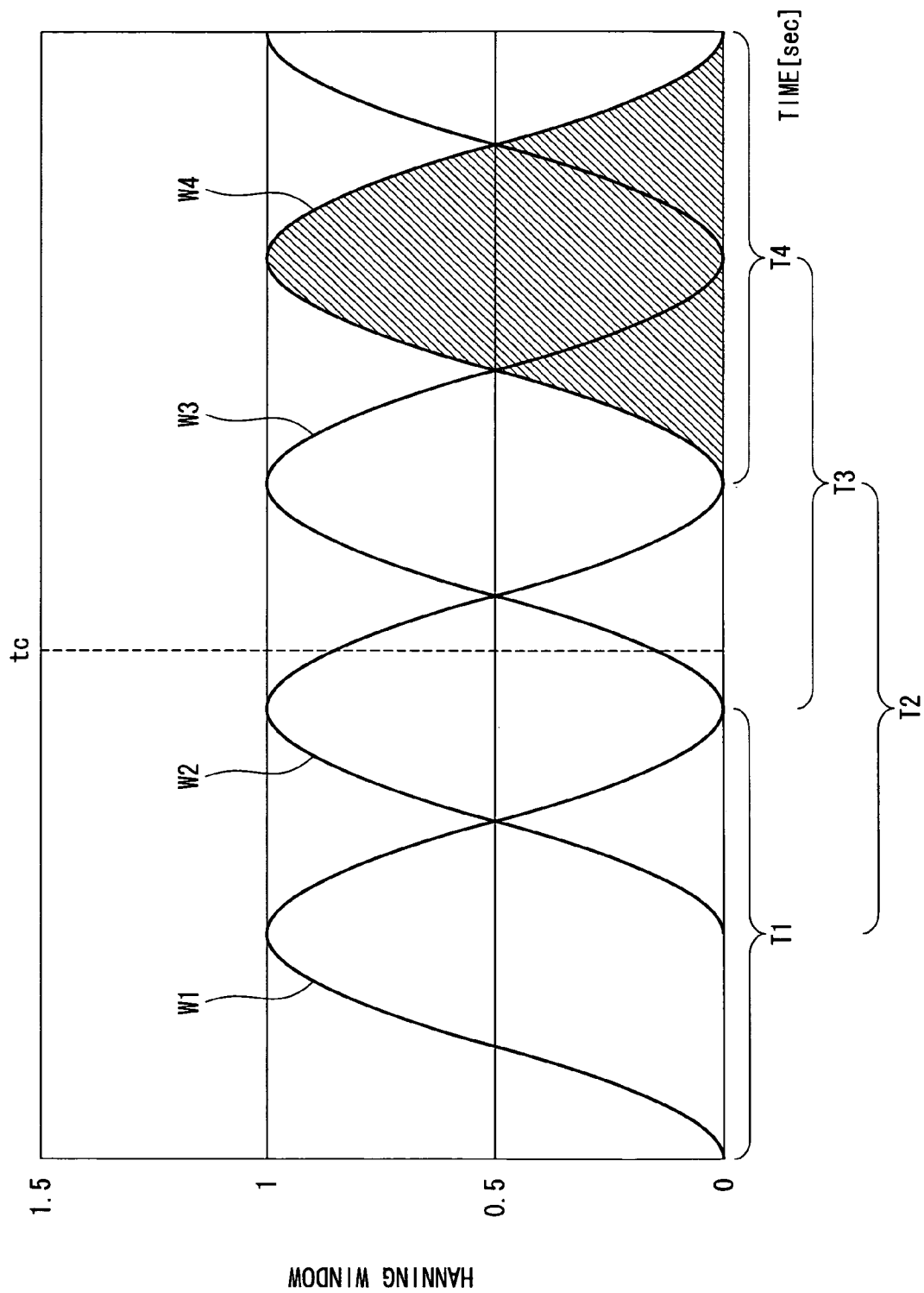
FIG. 14 is a diagram showing one example of the position relationship between the time tc, which is the end point of the section A, and the Hanning window function in the fourth embodiment of the present invention.

Hereinafter, the window function will be described, for example, as a Hanning window function. In FIGS. 12, 13, and 14, one example of the positional relationship between the time tc, which is the end point of the section A, and the window function is shown. The time tc is the time tc shown in FIGS. 9 and 10. In FIGS. 12 to 14, the window functions corresponding to previously determined sections T1 to T4 are defined as window functions W1 to W4, respectively.

For example, in the example shown in FIG. 12, when the section T1 does not include the time tc and is located before the time tc, the subtraction coefficient corresponding to the section T1 may be determined according to the relative position. When the section T2 includes the time tc, the subtraction coefficient corresponding to the section T2 may be determined based on the ratio of an area of the window function W2 in the section T2 and an area of the window function W2 since the time tc (a portion indicated by oblique lines in FIG. 12). The same applies to the subtraction coefficient corresponding to the section T3 (see FIG. 13). In FIG. 14, when the section T4 does not include the time tc and is located after the time tc, the subtraction coefficient corresponding to the section T4 may be determined according to the relative position.

The subtraction coefficient may be determined according to a relative position of the window function and the time tc even when the detection unit 191 detects an operation termination timing of the operation unit, similar to the case in which the detection unit 191 detects the operation initiation timing of the operation unit.

Figure 15:
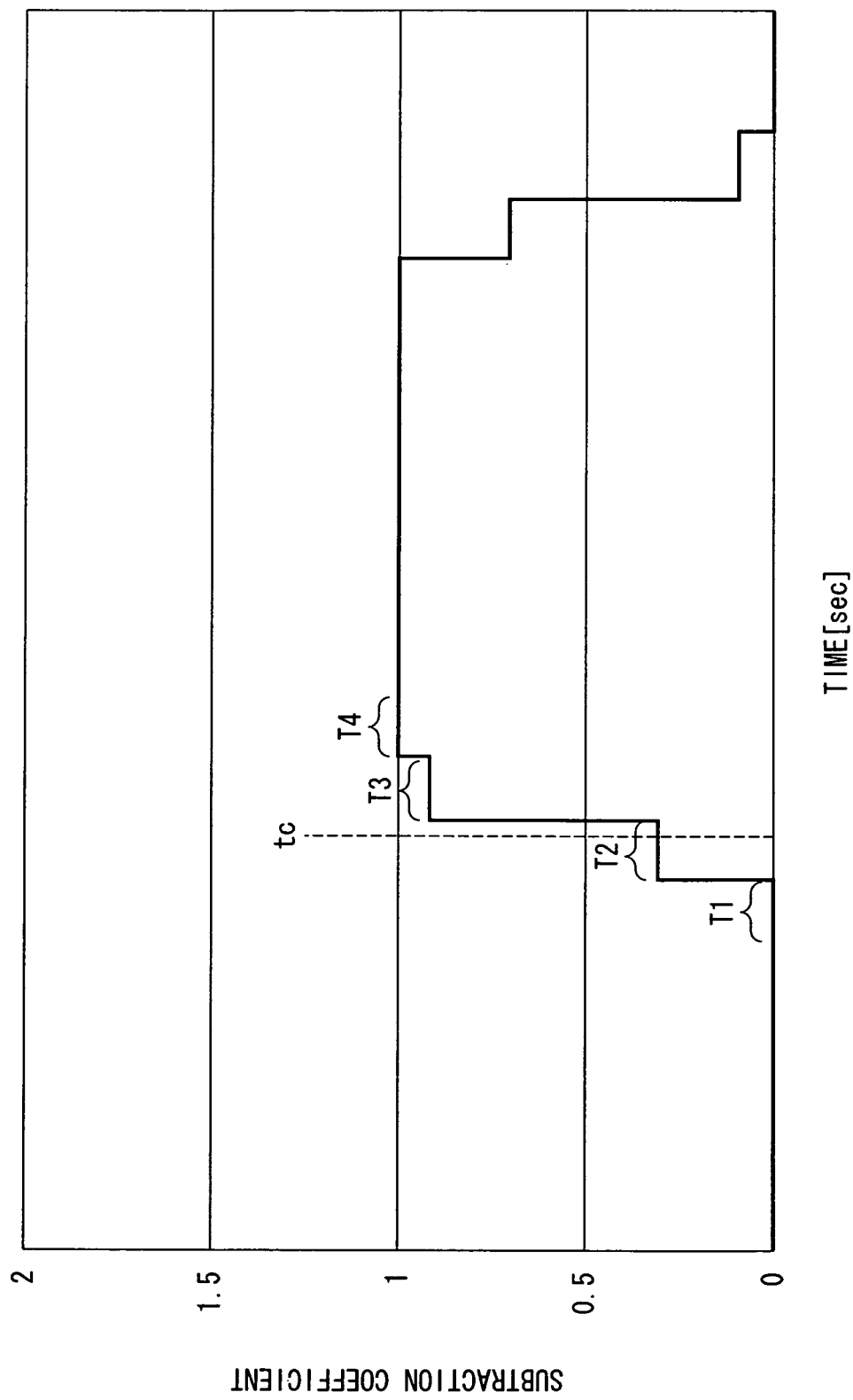
FIG. 15 is a diagram showing one example of a subtraction coefficient in the fourth embodiment of the present invention.

In FIG. 15, one example of the determined subtraction coefficient is shown. In the example shown in FIGS. 12 to 14, for example, the subtraction coefficient corresponding to the section T1 is a value "0", the subtraction coefficient corresponding to the section T2 is a value "0.3", the subtraction coefficient corresponding to the section T3 is a value "0.9", and the subtraction coefficient corresponding to the section T4 is a value "1". Each value is one example.

<Fifth Embodiment>

A fifth embodiment of the present invention will be described in detail with reference to the accompanying drawings. The fifth embodiment differs from the fourth embodiment in that the sound received by the microphone 230 (microphone output signal) does not have a basic period. Hereinafter, differences from the fourth embodiment will be described.

Figure 16:
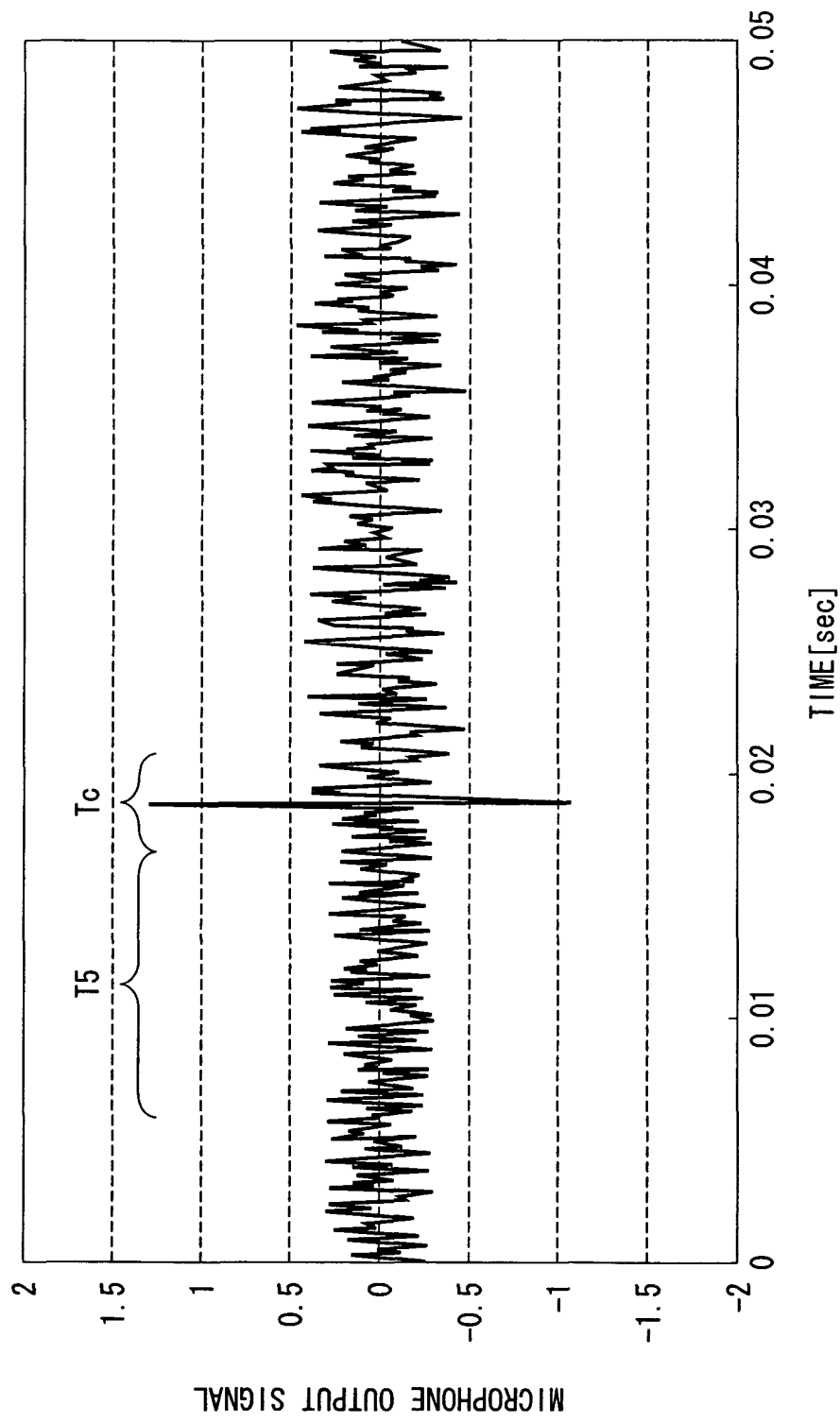
FIG. 16 is a diagram showing one example of an impact noise and a driving noise generated in a microphone output signal (aperiodic sound) in the fifth embodiment of the present invention.

In FIG. 16, one example of an impact noise and a driving noise generated in the microphone output signal (aperiodic sound) is shown. In FIG. 16, the detection unit 191 detects a timing indicating the operation initiation of the operation unit based on the operation unit initiating the operation. In FIG. 16, the impact noise generated in the microphone output signal, in the section Tc including that timing, is shown. The driving noise generated in the microphone output signal in the section in which the operation unit operates after the impact noise is generated is also shown. A section directly before the section Tc, which is a section T5 having a length of "section Tc+(section Tf)×2" is shown. Here, a length of each of the sections Tc and Tf may be determined in advance.

Figure 17:
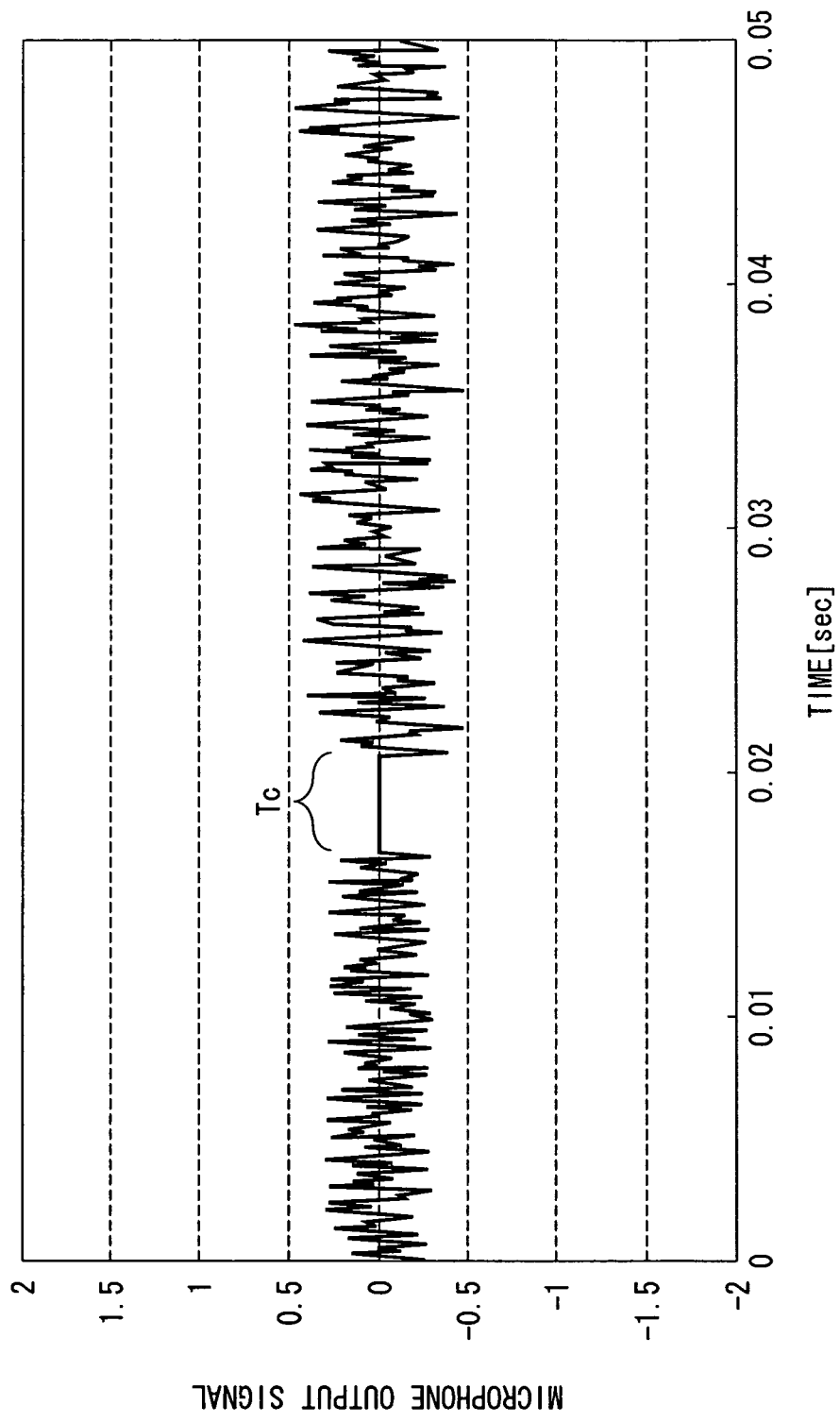
FIG. 17 is a diagram showing one example of a microphone output signal after a section Tc is removed in a time domain in the fifth embodiment of the present invention.
Figure 18:
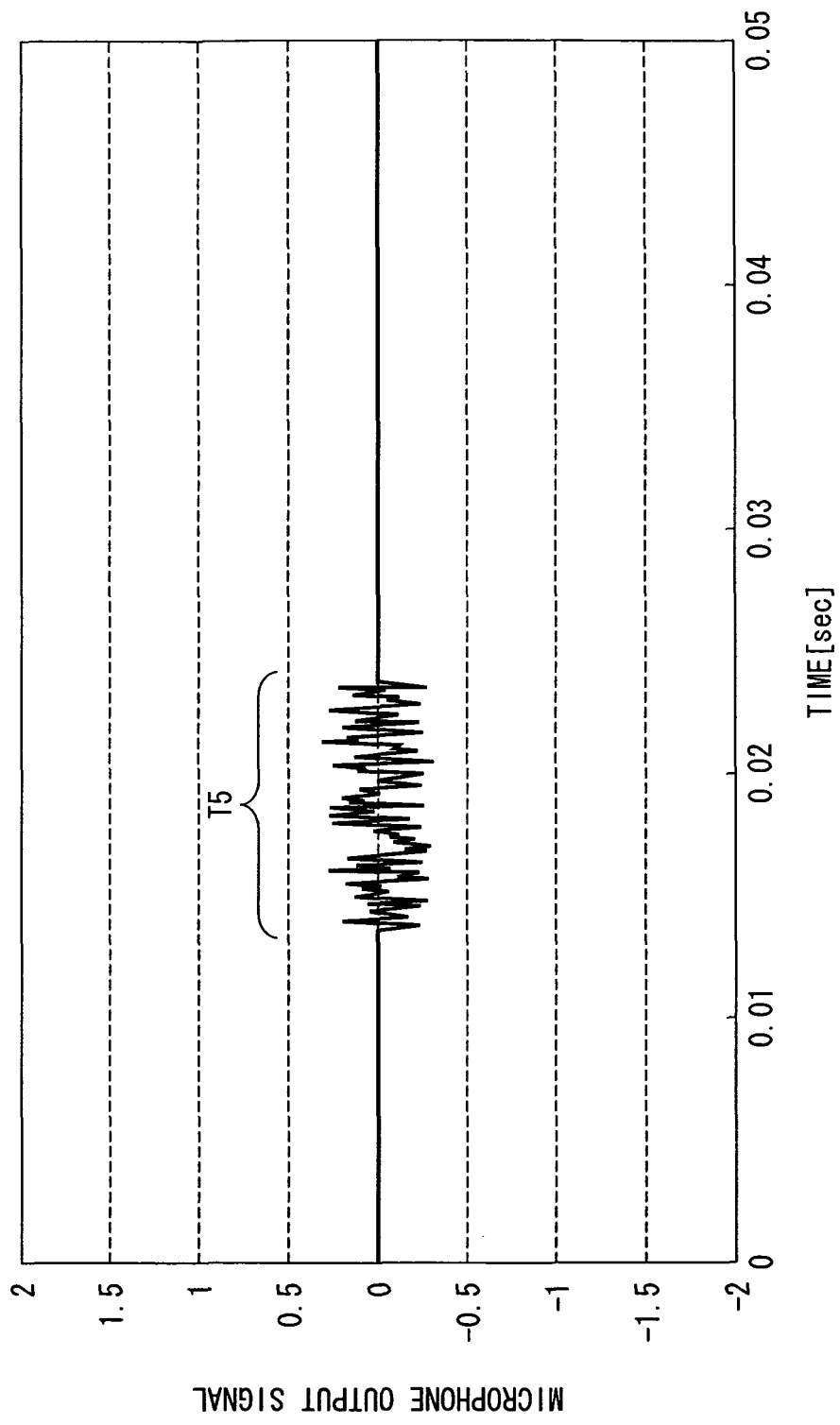
FIG. 18 is a diagram showing one example of a duplicated microphone output signal in the fifth embodiment of the present invention.

First, the reduction processing unit 2250 removes the section Tc from the microphone output signal. In FIG. 17, one example of the microphone output signal after the section Tc is removed in the time domain is shown. Further, the reduction processing unit 2250 duplicates the microphone output signal in the section T5 so that a middle point of a section directly before the section Tc, which is the section T5 having a length of "section Tc+(section Tf)×2" can be coincident with a middle point of the section Tc. In FIG. 18, one example of the duplicated microphone output signal is shown.

The reduction processing unit 2250 crossfades the microphone output signal after the section Tc is removed in the time domain (see FIG. 17) and the duplicated microphone output signal (see FIG. 18) to continuously connect the two signals.

Figure 19:
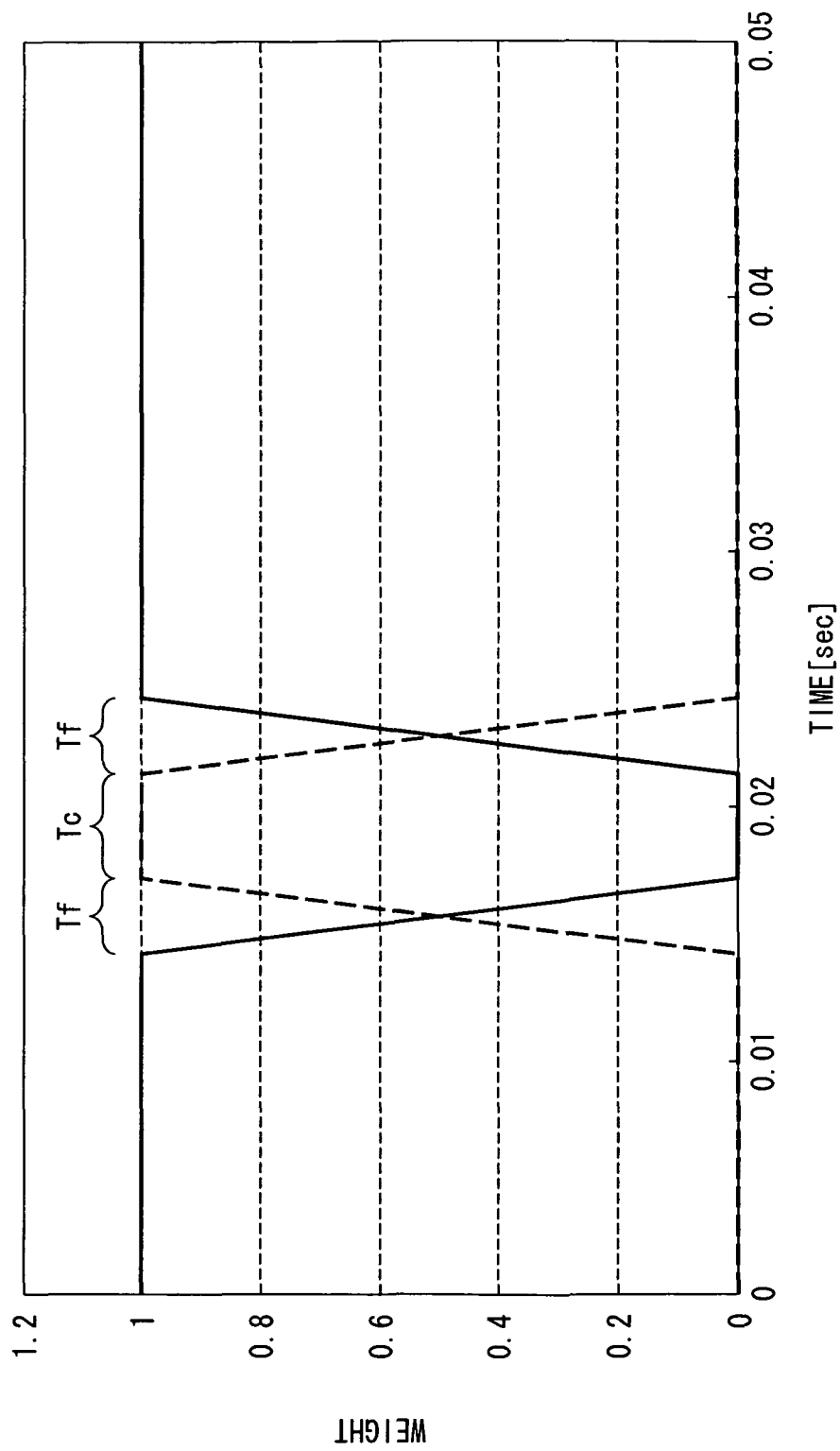
FIG. 19 is a diagram showing one example of weighting in crossfade in the fifth embodiment of the present invention.

In FIG. 19, one example of weighting in the crossfade is shown. The solid line shown in FIG. 19 indicates weighting for the microphone output signal after the section Tc is removed in the time domain (see FIG. 17). Meanwhile, the dotted line indicates weighting for the duplicated microphone output signal (see FIG. 18). The reduction processing unit 2250 may continuously connect the two signals by crossfading through such weighting.

Figure 20:
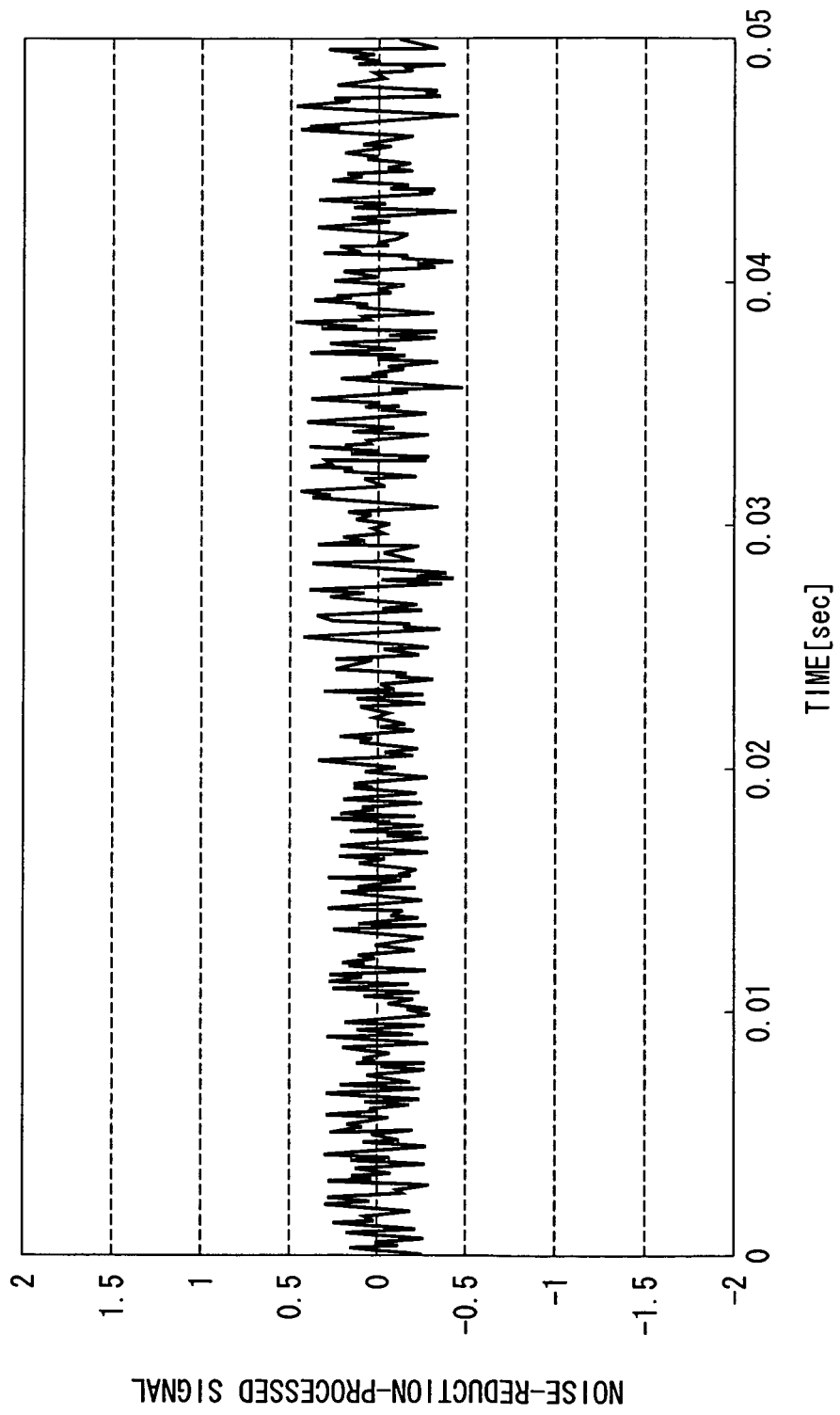
FIG. 20 is a diagram showing one example of a noise-reduction-processed signal obtained by reducing an impact noise and a driving noise from a microphone output signal in the fifth embodiment of the present invention.

Next, the reduction processing unit 2250 executes, for the section in which the driving noise is generated (the section in which the operation unit operates since the section Tc), the noise reduction process in the frequency domain, for example, using the spectrum subtraction method, to reduce the driving noise, similar to the fourth embodiment. In FIG. 20, one example of a noise-reduction-processed signal that is obtained by reducing the impact noise and the driving noise from the microphone output signal is shown.

Thus, the imaging device (photographing device) reduces the impact noise in the time domain and crossfades the microphone output signal with the reduced impact noise through the different process dependent on the determining, thus reducing the impact noise as well as the driving noise even when the microphone output signal does not have a basic period.

While the embodiments of the present invention have been described in detail with reference to the accompanying drawings, a specific configuration is not limited to the embodiments and includes a design within a range without departing from the spirit and the scope of the invention.

For example, as the zoom lens 114 moves in the optical system 111, the detection unit 191 may estimate a timing when the zoom lens 114 hits the end for limiting the movement range of the zoom lens 114 based on the movement amount of the zoom lens 114. Accordingly, the detection unit 191 may estimate a generation timing of the impact noise that is generated when the zoom lens 114 hits the end for limiting the movement range of the zoom lens 114.

For example, the detection unit 191 may detect the timing when the operation unit operates based on both of the signal indicating the timing and the microphone output signal. For example, since the impact noise includes a high frequency component, the detection unit 191 may pass the microphone output signal through a high pass filter and may detect the timing when the operation unit operates, based on intensity of power of the microphone output signal passing through the high pass filter.

For example, when the optical system 111 is detachably provided in the imaging device 100, any one of the microphone 230, the sound signal processing unit 2240, and the reduction processing unit 2250 may be included in an optical device (e.g., a lens barrel) including the optical system 111, which forms an image by the optical system (e.g., the lens).

For example, the reduction processing unit 2250 may omit the process of reducing all values of the microphone output signal in the section A to "0" and may replace the microphone output signal in the section A with the microphone output signal in the section B.

For example, the reduction processing unit 2250 may execute an SNG process for the microphone output signal.

For example, the subtraction coefficient does not depend on the area ratio in the window function, but may be determined, for example, according to the position of the time tc in the section.

For example, the reduction processing unit 2250 may add a previously determined delay time to the timing detected by the detection unit 191 and remove, in the time domain, the microphone output signal in a section including the resultant timing.

While the case in which the reduction processing unit 2250 performs signal processing on the sound signal received by the microphone 230 has been described, processing in the above-described reduction processing unit 2250 according to the present embodiment may be applied to signals other than the sound signal received in real time.

For example, even when a timing indicating that the operation unit included in the device that has recorded the sound signal operates is recorded, for example, in a storage unit such as the storage medium 200 to be related to a previously recorded sound signal, the reduction processing unit 2250 according to the present embodiment may execute signal processing for the previously recorded sound signal, as in the above-described signal processing.

Further, a program for executing the process by the detection unit 191, the determining unit 2251, or the reduction processing unit 2250, which is the process described above using FIGS. 6 to 20, may be recorded in a computer-readable recording medium, and the program recorded in the recording medium may be read and executed by a computer system to perform an execution process. The "computer system" noted herein may include an operating system (OS) and hardware such as peripheral devices.

Further, the "computer system" includes a homepage provision environment (or a display environment) only if the environment uses a WWW system. Further, the "computer-readable recording medium" includes a storage device, such as a flexible disk, a magneto-optical disk, a ROM, a writable non-volatile memory such as a flash memory, a portable medium such as a CD-ROM, or a hard disk embedded in the computer system.

Further, the "computer-readable recording medium" includes a medium for holding a program for a certain period of time, such as a volatile memory (e.g., dynamic random access memory; DRAM) inside a computer system configured of a server and a client when the program is transmitted via a network such as the Internet or a communication line such as a telephone line.

Further, the program may be transmitted from a computer system storing the program in a storage device to other computer systems via a transmission medium or by a transmission wave in the transmission medium. Here, the "transmission medium" transmitting the program is a medium having a function of transmitting information, such as a network (communication network) such as the Internet or a communication line such as a telephone line.

Further, the program may be a program for realizing a portion of the above-described function. Further, the program may be a program capable of realizing the above-described function through a combination with a program recorded in the computer system, i.e., may be a difference file (difference program).

What is claimed is:

1. A photographing device comprising:
   a photographing unit that photographs an image by an optical system;
   a microphone that converts a sound wave into an electrical signal;
   a signal detection unit that detects at least one of a sensor signal detected by a sensor for detecting a photographing state and a control signal for controlling photographing;
   a determining unit that determines whether there is a change in a photographing operation using at least one of the sensor signal and the control signal; and
   a noise processing unit that makes a process of reducing noise in the electrical signal different when the determining unit determines that there is a change in the photographing operation and when the determining unit does not determine that there is a change in the photographing operation,
   wherein the noise processing unit performs the noise reduction process in a time domain on the electrical signal when the determining unit determines that there is a change in the photographing operation, and performs the noise reduction process in a frequency domain on the electrical signal when the determining unit does not determine that there is a change in the photographing operation.

2. The photographing device according to claim 1, wherein the determining unit determines whether there is a change in the photographing operation generating an impact sound.

3. The photographing device according to claim 1, wherein the change of the photographing operation determined by the determining unit is at least one of an operation change of an actuator driven in photographing and an operation change of a manipulation unit capable of being manipulated by a photographing person.

4. The photographing device according to claim 1, wherein the determining unit determines whether there is a change in the photographing operation using the electrical signal.

5. The photographing device according to claim 1,
   wherein the determining unit determines at least one of initiation of the photographing operation and termination of the photographing operation, and
   the noise processing unit performs the noise reduction process using the electrical signal before the initiation of the photographing operation when the determining unit determines the initiation of the photographing operation, and performs the noise reduction process using the electrical signal after the termination of the photographing operation when the determining unit determines the termination of the photographing operation.

6. The photographing device according to claim 1, further comprising:
   a section setting unit that sets a predetermined section with respect to the electrical signal converted by the microphone, wherein
   the determining unit determines a section where the photographing operation is operated, and
   the noise processing unit performs the noise reduction process in a time domain on the electrical signal in a section where the determining unit determines that there is a change in the photographing operation, and performs the noise reduction process in a frequency domain on the electrical signal in a section where the determining unit does not determine that there is a change in the photographing operation and where the determining unit determines that the photographing operation is operated.

7. A photographing device comprising:
   a photographing unit that photographs an image by an optical system;
   a microphone that converts a sound wave into an electrical signal;
   a signal detection unit that detects at least one of a sensor signal detected by a sensor for detecting a photographing state and a control signal for controlling photographing;
   a determining unit that determines whether there is a change in a photographing operation using at least one of the sensor signal and the control signal; and
   a noise processing unit that makes a process of reducing noise in the electrical signal different when the determining unit determines that there is a change in the photographing operation and when the determining unit does not determine that there is a change in the photographing operation,
   wherein the noise processing unit performs the noise reduction process using the electrical signal as a signal defined for a time axis when the determining unit determines that there is a change in the photographing operation, and performs the noise reduction process using the electrical signal as a signal defined for a frequency when the determining unit does not determine that there is a change in the photographing operation.

8. A photographing device comprising:
   a photographing unit that photographs an image by an optical system:
   a microphone that converts a sound wave into an electrical signal;
   a signal detection unit that detects at least one of a sensor signal detected by a sensor for detecting a photographing state and a control signal for controlling photographing;
   a determining unit that determines whether there is a change in a photographing operation using at least one of the sensor signal and the control signal; and
   a noise processing unit that makes a process of reducing noise in the electrical signal different when the determining unit determines that there is a change in the photographing operation and when the determining unit does not determine that there is a change in the photographing operation, wherein the noise processing unit performs the noise reduction process on a time domain including a time in the electrical signal determined that there is a change in the photographing operation, and then performs the noise reduction process using the electrical signal as a signal defined for a frequency.

9. An optical device comprising:
a photographing unit that forms an image by the optical system;
a microphone that converts a sound wave into an electrical signal;
a signal detection unit that detects at least one of a sensor signal detected by a sensor for detecting a photographing state, and a control signal for controlling photographing;
a determining unit that determines whether there is a change in a photographing operation using at least one of the sensor signal and the control signal; and
a noise processing unit that makes a process of reducing noise in the electrical signal different when the determining unit determines that there is a change in the photographing operation and when the determining unit does not determine that there is a change in the photographing operation,
wherein the noise processing unit performs the noise reduction process using the electrical signal as a signal defined for a time axis when the determining unit determines that there is a change in the photographing operation, and performs the noise reduction process using the electrical signal as a signal defined for a frequency when the determining unit does not determine that there is a change in the photographing operation.

10. A non-transitory computer-readable medium storing a program for causing a computer to execute:
an input step of receiving a sound signal acquired upon photographing and at least one of a sensor signal detected by a sensor for detecting a photographing state, and a control signal for controlling photographing;
a determining step of determining whether there is a change in a photographing operation using at least one of the sensor signal and the control signal; and
a noise processing step of making a process of reducing noise in the sound signal different when it is determined that there is a change in the photographing operation and when it is not determined that there is a change in the photographing operation,
wherein the noise reduction process is executed in a time domain on the sound signal when the determining step determines that there is a change in the photographing operation, and the noise reduction process is executed in a frequency domain on the sound signal when the determining step does not determine that there is a change in the photographing operation.

11. A non-transitory computer-readable medium storing a program for causing a computer to execute:
an input step of receiving a sound signal acquired upon photographing and at least one of a sensor signal detected by a sensor for detecting a photographing state, and a control signal for controlling photographing;
a determining step of determining whether there is a change in a photographing operation using at least one of the sensor signal and the control signal; and
a noise processing step of making a process of reducing noise in the sound signal different when it is determined that there is a change in the photographing operation and when it is not determined that there is a change in the photographing operation,
wherein the noise reduction process is executed using the sound signal as a signal defined for a time axis when the determining step determines that there is a change in the photographing operation, and the noise reduction process is executed using the sound signal as a signal defined for a frequency when the determining step does not determine that there is a change in the photographing operation.

12. A non-transitory computer-readable medium storing a program for causing a computer to execute:
an input step of receiving a sound signal acquired upon photographing and at least one of a sensor signal detected by a sensor for detecting a photographing state, and a control signal for controlling photographing;
a determining step of determining whether there is a change in a photographing operation using at least one of the sensor signal and the control signal; and
a noise processing step of making a process of reducing noise in the sound signal different when it is determined that there is a change in the photographing operation and when it is not determined that there is a change in the photographing operation,
wherein the noise reduction process is executed on a time domain including a time in the sound signal determined that there is a change in the photographing operation, and then the noise reduction process is executed using the sound signal as a signal defined for a frequency.

13. A non-transitory computer-readable medium storing a program for causing a computer to execute:
an input step of receiving a sound signal acquired upon photographing and at least one of a sensor signal detected by a sensor for detecting a photographing state, and a control signal for controlling photographing;
a determining step of determining whether there is a change in a photographing operation using at least one of the sensor signal and the control signal; and
a noise processing step of making a process of reducing noise in the sound signal different when it is determined that there is a change in the photographing operation and when it is not determined that there is a change in the photographing operation,
wherein the noise reduction process is executed using the sound signal as a signal defined for a time axis when the determining step determines that there is a change in the photographing operation, and the noise reduction process is executed using the sound signal as a signal defined for a frequency when the determining step does not determine that there is a change in the photographing operation.

* * * * *